United States Patent
Lee et al.

(10) Patent No.: US 8,238,294 B2
(45) Date of Patent: Aug. 7, 2012

(54) SYSTEM AND METHOD FOR RESERVING RESOURCES IN A MOBILE NETWORK ENVIRONMENT USING MULTIPLE INTERFACES

(75) Inventors: Sung-Hyuck Lee, Daegu-si (KR); Su-Won Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1269 days.

(21) Appl. No.: 11/713,799

(22) Filed: Mar. 5, 2007

(65) Prior Publication Data

US 2007/0211638 A1 Sep. 13, 2007

(30) Foreign Application Priority Data

Mar. 4, 2006 (KR) ......................... 10-2006-0020733

(51) Int. Cl.
*G06F 11/00* (2006.01)
(52) U.S. Cl. ........................ 370/329; 370/235
(58) Field of Classification Search .................. 370/235, 370/237–238.1, 329–336, 389–393, 396–395.43
See application file for complete search history.

(56) References Cited

U.S. PATENT DOCUMENTS

| | | | | |
|---|---|---|---|---|
| 6,496,505 B2* | 12/2002 | La Porta et al. | ............... | 370/392 |
| 6,507,567 B1* | 1/2003 | Willars | .......................... | 370/321 |
| 6,904,017 B1* | 6/2005 | Meempat et al. | ............ | 370/238 |
| 6,985,454 B1* | 1/2006 | Wiedeman et al. | ............ | 370/316 |
| 6,999,436 B2* | 2/2006 | Zheng et al. | .................... | 370/331 |
| 7,013,142 B2* | 3/2006 | Roux et al. | ..................... | 455/442 |
| 7,089,009 B1* | 8/2006 | Fauconnier | .................... | 455/445 |
| 7,225,268 B2* | 5/2007 | Watanabe | ...................... | 709/238 |
| 7,292,575 B2* | 11/2007 | Lemieux et al. | .............. | 370/392 |
| 7,339,928 B2* | 3/2008 | Choyi et al. | .................... | 370/390 |
| 2001/0006513 A1* | 7/2001 | Kim | .............................. | 370/331 |
| 2002/0057657 A1* | 5/2002 | La Porta et al. | ............... | 370/331 |
| 2002/0122410 A1* | 9/2002 | Kulikov et al. | ............... | 370/349 |
| 2003/0048750 A1* | 3/2003 | Kobayashi | ..................... | 370/229 |
| 2003/0156541 A1* | 8/2003 | Haihong | ......................... | 370/235 |
| 2003/0202468 A1* | 10/2003 | Cain et al. | ...................... | 370/229 |
| 2003/0202476 A1* | 10/2003 | Billhartz et al. | .............. | 370/236 |
| 2004/0005894 A1* | 1/2004 | Trossen et al. | ................ | 455/436 |
| 2004/0122976 A1* | 6/2004 | Dutta et al. | ..................... | 709/245 |
| 2004/0125795 A1* | 7/2004 | Corson et al. | ................. | 370/356 |
| 2004/0136324 A1* | 7/2004 | Steinberg et al. | ............. | 370/238 |
| 2004/0192221 A1* | 9/2004 | Matsunaga | ..................... | 455/76 |

(Continued)

FOREIGN PATENT DOCUMENTS

EP 1 294 138 A2 3/2003

(Continued)

*Primary Examiner* — Chi Pham
*Assistant Examiner* — Prince A Mensah
(74) *Attorney, Agent, or Firm* — NSIP Law

(57) ABSTRACT

A system and method for reserving resources for a Mobile Node (MN) having a plurality of wireless network interfaces in a mobile network under a multi-homed environment are provided, wherein the MN transmits query messages requesting a path be setup to a plurality of Access Routers (ARs) accessible through the wireless network interfaces, a Crossover Router Node (CRN), shared by a plurality of paths running to a CN via the ARs, selects an optimal path from among the plurality of paths using the path information set in the query messages propagated through the plurality of paths, the CRN transmits the resource reserve message through the selected optimal path, and the routers existing in the optimal path reserve resources according to the resource reserve message.

22 Claims, 20 Drawing Sheets

U.S. PATENT DOCUMENTS

| | | | |
|---|---|---|---|
| 2004/0202183 A1* | 10/2004 | Thubert et al. | 370/395.31 |
| 2004/0213181 A1* | 10/2004 | Grech et al. | 370/331 |
| 2004/0219918 A1* | 11/2004 | Kakishima et al. | 455/436 |
| 2004/0228304 A1* | 11/2004 | Riedel et al. | 370/332 |
| 2004/0252696 A1* | 12/2004 | Kakishima et al. | 370/395.2 |
| 2004/0264409 A1* | 12/2004 | Lee et al. | 370/329 |
| 2005/0105489 A1 | 5/2005 | Jee et al. | |
| 2005/0105490 A1* | 5/2005 | Lee et al. | 370/331 |
| 2005/0185653 A1* | 8/2005 | Ono et al. | 370/395.21 |
| 2006/0007863 A1* | 1/2006 | Naghian | 370/238 |
| 2006/0109829 A1* | 5/2006 | O'Neill | 370/338 |
| 2007/0070938 A1* | 3/2007 | Hori et al. | 370/328 |
| 2007/0101018 A1* | 5/2007 | Shirazipour et al. | 709/238 |
| 2007/0153782 A1* | 7/2007 | Fletcher et al. | 370/389 |

FOREIGN PATENT DOCUMENTS

| | | |
|---|---|---|
| KR | 10-2005-0046092 A | 5/2005 |
| WO | WO 2004/233323 A1 | 3/2004 |

* cited by examiner

SYSTEM AND METHOD FOR RESERVING RESOURCES IN A MOBILE NETWORK ENVIRONMENT USING MULTIPLE INTERFACES

CROSS-REFERENCE TO RELATED PATENT APPLICATION

This application claims the benefit under 35 U.S.C. §119 (a) of Korean Patent Application No. 2006-20733, filed Mar. 4, 2006, in the Korean Intellectual Property Office, the entire disclosure of which is hereby incorporated by reference.

BACKGROUND OF THE INVENTION

1. Field of the Invention

The present invention generally relates to a system and method for reserving resources in a multi-homed environment. More particularly, the present invention relates to a system and method for reserving resources through a plurality of network interfaces using a plurality of Care-of-Addresses (CoAs).

2. Description of the Related Art

Typically, the Quality of Service (QoS) of multimedia application services must be guaranteed for a Mobile Node (MN), even during handover in a mobile network.

For the QoS guarantee, the mobile network performs a resource reservation status management. The resource reservation status management is a scheme of reserving certain resources for each session beforehand, to thereby ensure QoS continuously.

Existing protocols proposed for the resource reservation status management includes Resource Reservation Protocol (RSVP), Extended-RSVP (E-RSVP), Mobile RSVP (MRSVP), RSVP Tunnel, Concatenating and Optimizing Resource Reservation Path (CORP), Hierarchical Mobile RSVP (H-MRSVP), and so forth.

Under a multi-homed environment, the mobile network must be able to choose an optimal path from among a plurality of paths. The multi-homed environment refers to a communication environment in which an MN with a plurality of network interfaces can set up different paths through the network interfaces.

Hence, the mobile network must carry out the resource reservation status management to guarantee QoS under the multi-homed environment. However, the conventional protocols for resource reservation status management commonly do not consider the multi-homed environment.

Accordingly, there is a need for an improved resource reservation status management scheme in the mobile network under the multi-homed environment. The resource reservation status management scheme should consider load sharing in a plurality of paths.

SUMMARY OF THE INVENTION

Exemplary embodiments of the present invention address at least the problems and/or disadvantages and provide at least the advantages described below. Accordingly, an aspect of exemplary embodiments of the present invention is to provide a system and method for resource reservation status management in a mobile network under a multi-homed environment.

Another aspect of exemplary embodiments of the present invention is to provide a system and method for resource reservation status management in a mobile network under a multi-homed environment, in which an optimal path chosen from among a plurality of paths is established.

A further aspect of exemplary embodiments of the present invention is to provide a system and method for resource reservation status management in a mobile network under a multi-homed environment, in which an optimal path is established, taking into account the amount of resources available to each path.

Still another aspect of exemplary embodiments of the present invention is to provide a system and method for resource reservation status management in a mobile network under a multi-homed environment, in which an optimal path is established, taking into account the amount of available resources and the time delay of each path.

Still further aspect of exemplary embodiments of the present invention is to provide a system and method for resource reservation status management in a mobile network under a multi-homed environment, in which an additional path is established in addition to an already-established optimal path.

Yet another aspect of exemplary embodiments of the present invention is to provide a system and method for resource reservation status management in a mobile network under a multi-homed environment, in which load is shared among a plurality of paths.

Yet further aspect of exemplary embodiments of the present invention is to provide a system and method for resource reservation status management in a mobile network under a multi-homed environment, wherein when a load is shared among a plurality of paths, a bound session Identifier (ID) is allocated to the common path shared by the plurality of paths.

Yet still another aspect of exemplary embodiments of the present invention is to provide a system and method for resource reservation status management in an Internet Protocol (IP)-based mobile network, wherein resources can be reserved through a wireless network interface rich in available resources by reserving resources for a Mobile Node (MN), taking into account the multi-homing features of the MN.

In accordance with an aspect of exemplary embodiments of the present invention, there is provided a method for reserving resources for an MN having a plurality of wireless network interfaces in a mobile network under a multi-homed environment, wherein the MN transmits query messages requesting a path be setup to a plurality of Access Router Nodes (ARs) accessible through the wireless network interfaces, a Cross-over Router Node (CRN) shared by a plurality of paths running to a Correspondent Node (CN) via the ARs selects an optimal path from among the plurality of paths using the path information set in the query messages propagated through the plurality of paths, the CRN transmits a resource reserve message through the selected optimal path, and the routers existing in the optimal path reserve resources according to the resource reserve message.

In accordance with another aspect of an exemplary embodiment of the present invention, there is provided a method for reserving resources for an MN having a plurality of wireless network interfaces in a mobile network under a multi-homed environment, wherein the MN transmits query messages requesting a path be setup to a plurality of ARs accessible through the wireless network interfaces, a CRN shared by a plurality of paths running to a CN via the ARs selects at least two paths from among the plurality of paths using path information set in the query messages propagated through the plurality of paths, the CRN allocates a total allocation bandwidth separately to the at least two paths, the CRN transmits a resource reserve message through the at least two paths, and the routers existing in the at least two paths reserve resources according to the resource reserve message.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

Figure 1:
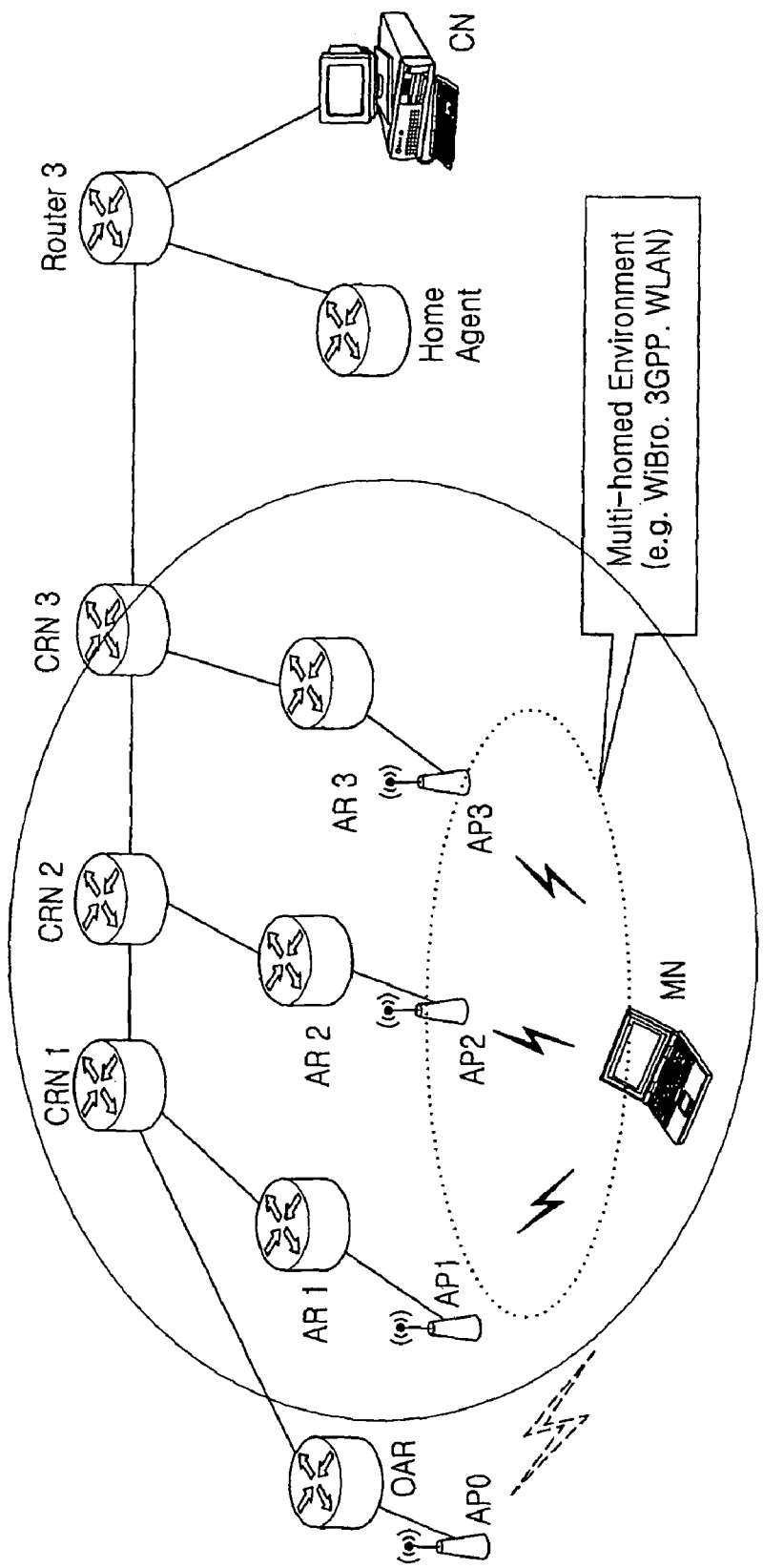
FIG. 1 illustrates a mobile network in a multi-homed environment, to which exemplary embodiments of the present invention are applied.

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention are intended to provide a system and method for resource reservation status management in a mobile network under a multi-homed environment. The resource reservation status management system and method will be described in the context of a handover of an MN from a serving cell to a target cell.

For this purpose, a method for selecting an optimal path from among a plurality of paths when the MN enters the target cell and a method for processing desired traffic by reserving resources for the optimal path will be described in great detail.

In addition, a description will be made of a method for determining an additional path in addition to the already-established optimal path and reserving resources for the additional path to thereby process traffic in a distributed fashion. Further, a method for selecting at least two optimal paths from among the plurality of paths when the MN enters the target cell, and a method for processing desired traffic in a distributed fashion by reserving resources for the at least two optimal paths will be described in detail.

Resource reservation for establishing an optimal path or an additional path can be initiated on the side of a receiver or a sender. The receiver-initiated resource reservation and the sender-initiated resource reservation are presented as different exemplary embodiments. In an exemplary embodiment of the present invention, it is understood that the receiver is a Correspondent Node (CN) and the sender is an MN.

Terms used herein are first defined as follows.

Mobile Node (MN): a terminal equipped with a plurality of wireless network interfaces. It can establish different paths through the wireless network interfaces.

Access Router (AR): a router that can be connected directly to the MN through an Access Point (AP).

Old Access Router (OAR): a router to which the MN is connected before a handover is completed.

Neighbor Access Router (NAR): a router to which the MN can move by handover.

Target Access Router (TAR): a router to which the MN can attempt to establish a path during a handover.

Crossover Router Node (CRN): a router at which an old path established with an OAR by the MN intersects with a new path to be set up with an NAR by the MN.

Correspondent Node (CN): a destination to which the MN sends traffic data in a particular session.

Relay Router (RR): a router between a CRN and an OAR in an old path, or a router between the CRN and the TAR in a new path, or a router between the CRN and the CN in the old path or the new path.

FIG. 1 illustrates a mobile network in a multi-homed environment, to which exemplary embodiments of the present invention are applied. In the illustrated case of FIG. 1, an MN is placed in a handover situation.

Referring to FIG. 1, the MN determines whether a handover is required, while it is connected to an OAR. The determination is made according to the strength of a signal received from the OAR or NARs (AR 1, AR 2 and AR 3). For example, the MN makes a decision as to whether to perform the handover by monitoring whether the received signal strength of the OAR drops below a threshold or whether the received signal strengths of the NARs increase to or above the threshold.

When the handover is required, the MN performs the handover to the NARs as TARs. Notably, the MN selects at least one optimal path from among a plurality of paths that can be established with the TARs by the handover. The optimal path is determined according to at least one of the amounts of resources (e.g. bandwidth) and the time delay of each of the paths.

If the at least one optimal path is selected, resources are allocated to the optimal path, and thus, the optimal path is established. The resource allocation takes place at each of a CRN, an RR, and the TAR existing in the optimal path. The MN sends traffic data through the optimal path using the allocated resources. The traffic data can be data of a wireless broadcasting service, a future-generation mobile communication service, or a Wireless Local Area Network (WLAN) service.

If additional resources are needed with the optimal path established, an additional path is chosen from among the other paths, except the optimal path. The additional path is established by allocating resources to the additional path. This resource allocation takes place each of a CRN, an RR and a TAR in the additional path. Thus, the MN sends traffic data through the optimal path and the additional path using the allocated resources.

In the case where a plurality of optimal paths or a plurality of additional paths are established, a bound session ID is given to the common path shared by the plurality of paths in order to facilitate processing of the traffic data collected at a final CRN from the plurality of paths. The final CRN is a CRN to which all established paths lead. Accordingly, the single bound session ID is used between the final CRN and a CN. In FIG. 1, CRN 3 is the final CRN.

While not shown, an RR may reside between each CRN and a TAR and between the final CRN and the CN.

A. Embodiment 1

A receiver-initiated (i.e. CN-initiated) resource allocation for at least one optimal path chosen from among a plurality of paths and, when needed, for an additional path will be described below in great detail.

As stated before, the receiver-initiated resource allocation is the process of reserving resources by sending a RESERVE MESSAGE from the receiver (i.e. CN) to the MN and receiving an ACKnowledgement (ACK) MESSAGE at the receiver from the MN. The ACK MESSAGE is optional.

A-1. Setup of Optimal Path

How an optimal path is chosen from among a plurality of paths and established in a mobile network under a multi-homed environment according to an exemplary embodiment of the present invention will be described.

In accordance with the exemplary embodiment of the present invention, the optimal path setup process is divided into optimal path selection and optimal path setup by reserving resources for the optimal path.

a. Optimal Path Selection

Figure 2:
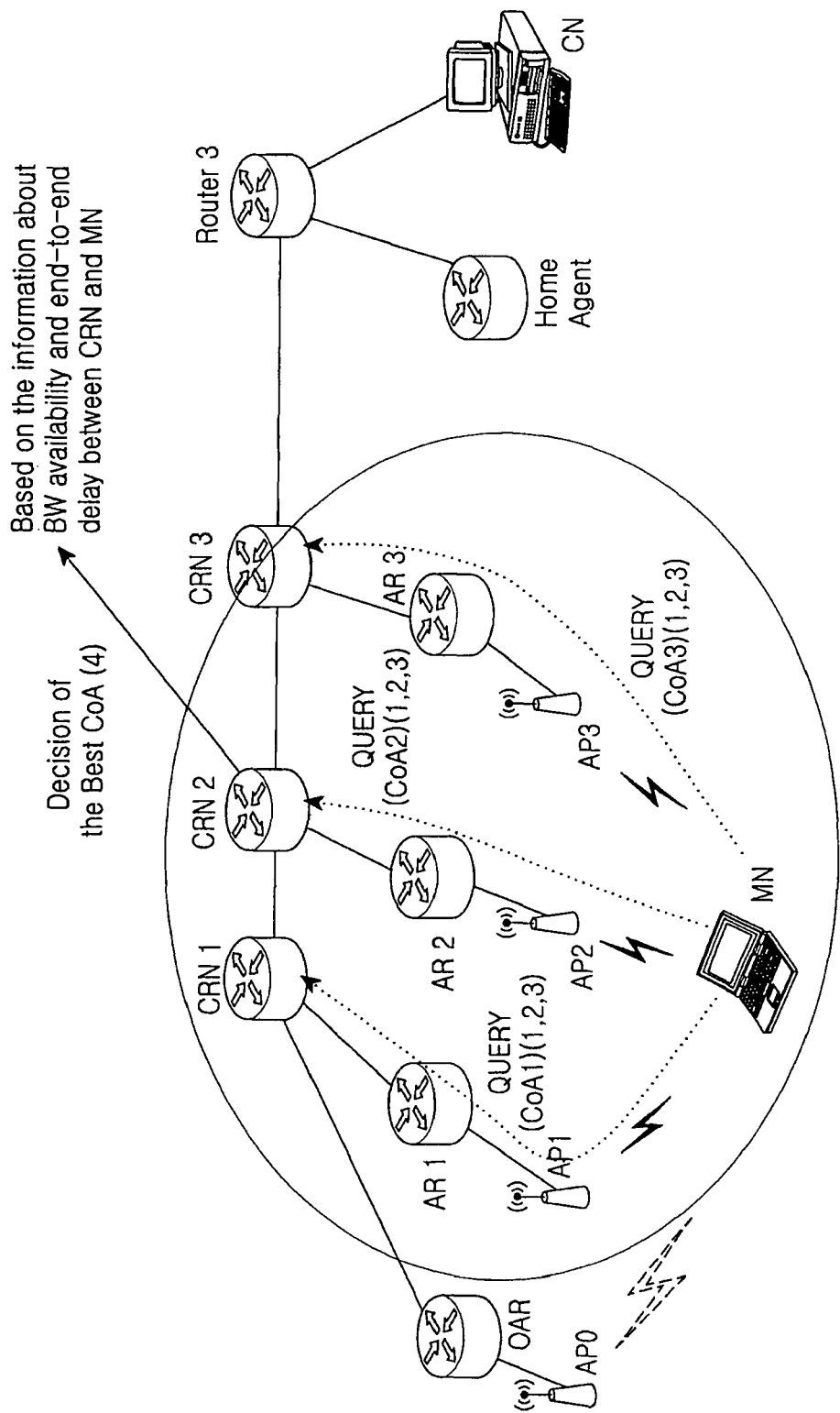
FIG. 2 illustrates an operation for selecting an optimal path in the mobile network under the multi-homed environment according to an exemplary embodiment of the present invention.

FIG. 2 illustrates an operation for selecting an optimal path in the mobile network under the multi-homed environment according to the exemplary embodiment of the present invention. In the illustrated case of FIG. 2, the MN performs a handover from an old cell to a new cell and three accessible routers (ARs), AR 1, AR 2, and AR 3, exist in the new cell. A detailed description of an operation before the handover is not provided herein.

Referring to FIG. 2, the MN sends QUERY MESSAGEs to AR 1, AR 2 and AR 3. Each of the QUERY MESSAGEs has a CoA to identify a path in which it travels. The CoA can have a Mobile IP address as a source address. It is understood herein that a first QUERY MESSAGE sent to AR 1 includes CoA 1, a second QUERY MESSAGE sent to AR 2 includes CoA 2, and a third QUERY MESSAGE sent to AR 3 includes CoA 3.

The first QUERY MESSAGE sent to AR 1 is delivered to the final CRN, CRN 3 via CRN 1, the second QUERY MESSAGE sent to AR 2 is delivered to CRN 3 through CRN 2, and the third QUERY MESSAGE sent to AR 3 is delivered to CRN 3. While the ARs are mapped to the CRNs in a one-to-one correspondence, a plurality of ARs may share a single CRN.

Upon receipt of the QUERY MESSAGEs from the plurality of paths, CRN 3 determines an optimal path based on the available resource information set in the QUERY MESSAGEs. Available resource information for a path indicates the minimum bandwidths that ARs existing in the path can allocate. CRN 3 selects a path that satisfies an MN-requested bandwidth as an optimal path.

CRN 3 may further consider the arrival order of the QUERY MESSAGEs in selecting the optimal path. Yet, the consideration is viable on the premise that the requested bandwidth is known to CRN 3. For example, the QUERY MESSAGEs should inform the requested bandwidth of the MN.

When a plurality of paths can satisfy the requested bandwidth, the arrival order is considered. In this case, a path from which the first QUERY MESSAGE arrives at CRN 3 is chosen as the optimal path, which implies that the path offers the shortest transmission delay.

Table 1 below is an exemplary table that CRN 3 can make to select the optimal path, taking into account the available resource information and the arrival order.

TABLE 1

| CoA | Available resource information | Arrival order |
|---|---|---|
| CoA 2 | 5 Mbps | 1 |
| CoA 1 | 3 Mbps | 2 |
| CoA 3 | 2 Mbps | 3 |

When considering the available resource information only, CRN 3 chooses a path with CoA 2 as the optimal path. Given a requested bandwidth of 3 Mbps, paths with CoA 1 and CoA 2 satisfy the requested bandwidth. Since the plurality of paths fulfills the optimal path condition, the path with CoA 2, from which the QUERY MESSAGE arrives at CRN 3 the earliest, is selected as the optimal path.

Figure 3:
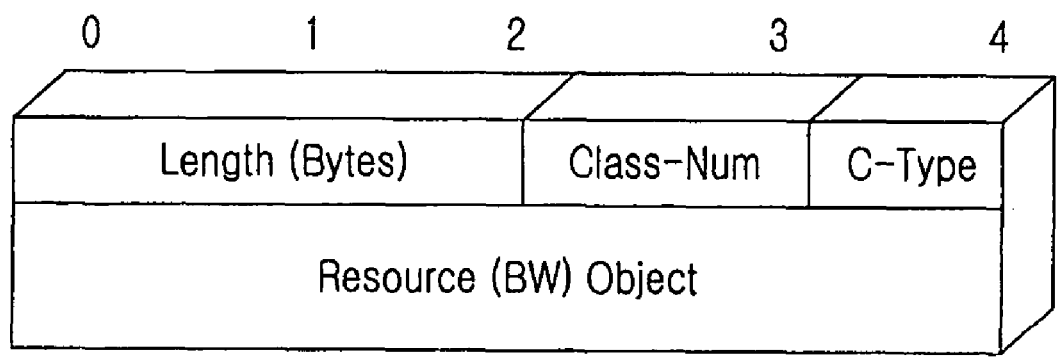
FIG. 3 illustrates an exemplary QUERY MESSAGE sent in each path according to an exemplary embodiment of the present invention.

FIG. 3 illustrates an exemplary QUERY MESSAGE propagated in each path according to the exemplary embodiment of the present invention.

Referring to FIG. 3, the QUERY MESSAGE includes a Resource Object field for providing information about bandwidth availability, specifically, available resource information. Upon receipt of the QUERY MESSAGE, an AR existing in the path writes a bandwidth that it can allocate as available resource information in the Resource Object field.

Writing available resource information by all ARs in the path is a burden on the size of the Resource Object field. Preferably but not necessarily, a minimum bandwidth available to the path is written as available resource information in the Resource Object field.

For instance, a first AR among ARs existing in the path writes its available bandwidth as available resource information. The other ARs update the available resource information with their information about bandwidth availability only when the Resource Object field has a bandwidth higher than their available bandwidths.

Figure 4:
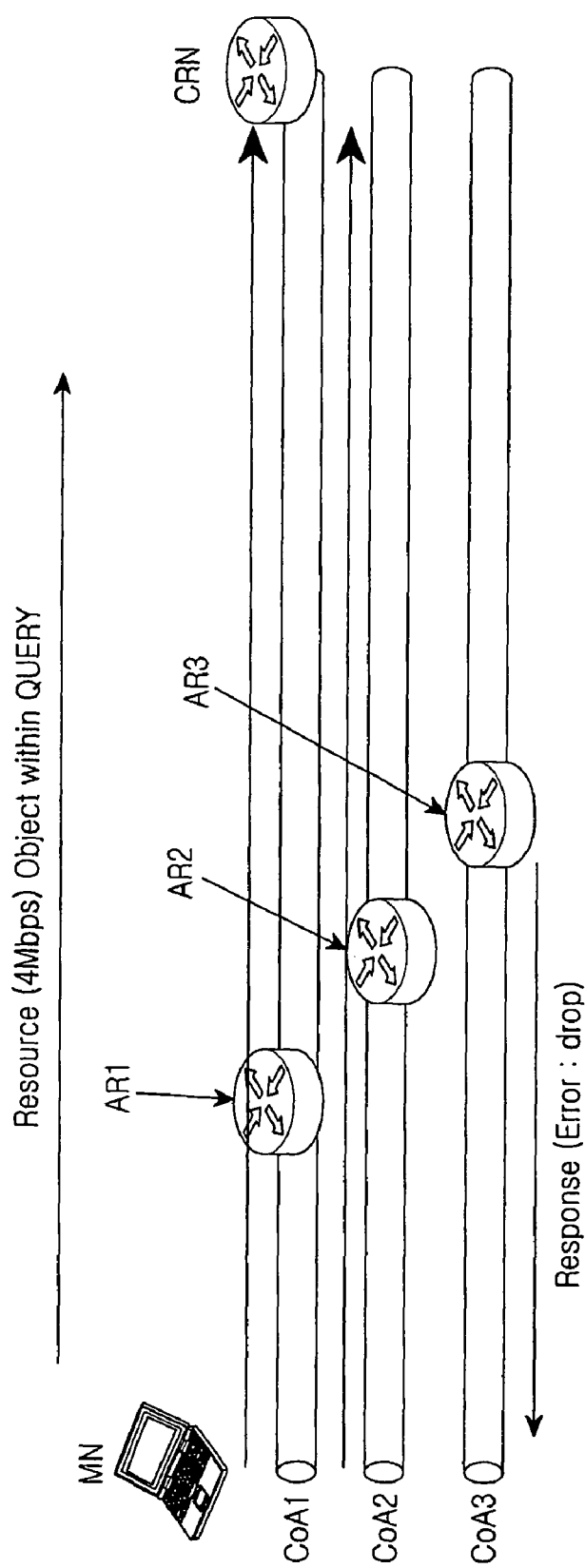
FIG. 4 illustrates an example of optimal path selection, wherein an MN informs a requested bandwidth by the QUERY MESSAGE.

FIG. 4 illustrates an example of optimal path selection, when the MN informs a requested bandwidth by the QUERY MESSAGE. In the illustrated case of FIG. 4, ARs existing in paths drop QUERY MESSAGEs if they cannot allocate the requested bandwidth, and an optimal path is selected based on passed QUERY MESSAGEs.

Referring to FIG. 4, the MN sends QUERY MESSAGEs with unique CoAs to AR 1, AR 2 and AR3. Each of AR 1, AR 2 and AR3 detects the requested bandwidth from its received QUERY MESSAGE and determines whether available resources of the AR can satisfy the requested bandwidth. If the requested bandwidth is not satisfied, the received QUERY MESSAGE is not forwarded further. In other words, this QUERY MESSAGE does not affect the optimal path selection. The AR that has dropped the QUERY MESSAGE notifies the MN of the message drop. In FIG. 4, AR 3 drops the QUERY MESSAGE. Table 2 illustrates an example of dropping the QUERY MESSAGE by AR 3.

TABLE 2

| CoA | Available resource information | AR index | Requested bandwidth | Result |
|---|---|---|---|---|
| CoA 1 | 7 Mbps | 2 | 4 Mbps | Pass |
| CoA 2 | 5 Mbps | 1 | | Pass |
| CoA 3 | 2 Mpbs | 3 | | Drop |

Referring to Table 2, the MN requests 4 Mbps by the QUERY MESSAGEs. AR 2 can allocate 7 Mbps and thus forwards the QUERY MESSAGE to the next AR. AR 1, which can allocate 5 Mbps, forwards the QUERY MESSAGE to the next AR. However, AR 3 can allocate only 2 Mbps and thus drops the QUERY MESSAGE.

While an AR operation has been described above regarding FIG. 4, an RR existing between a CRN and an AR in each path can drop a received QUERY MESSAGE in the same manner.

Figure 5:
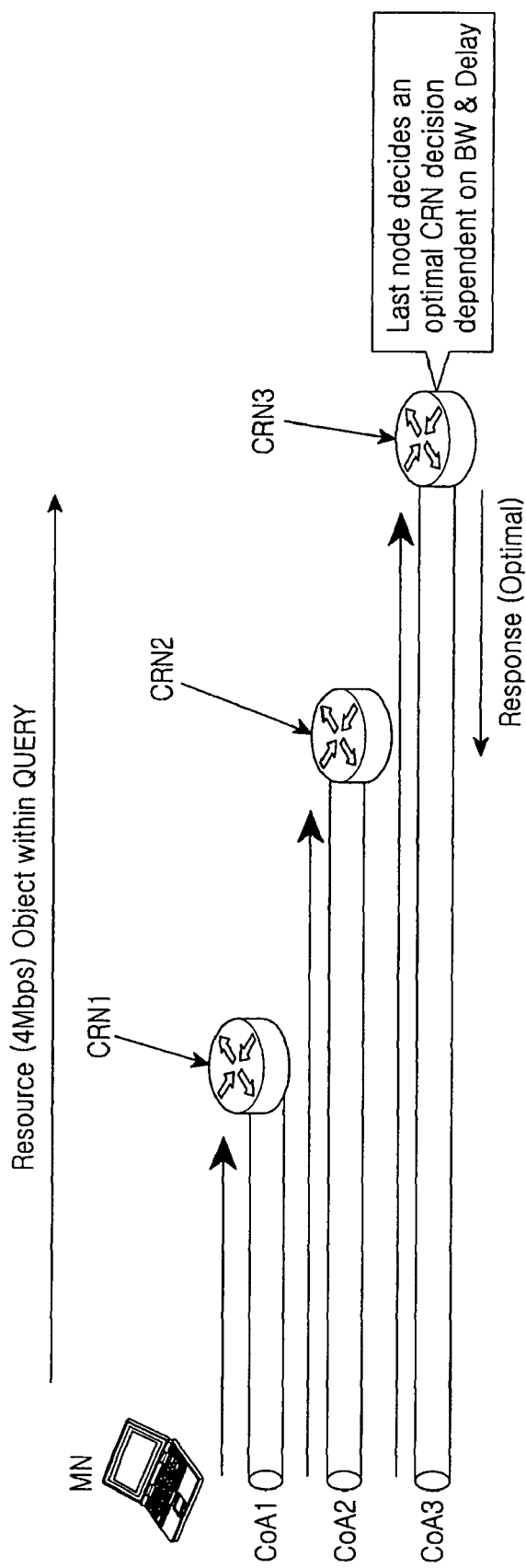
FIG. 5 illustrates an example of the determination of a final Crossover Router Node (CRN) according to the exemplary embodiment of the present invention.

FIG. 5 illustrates an example of determination of a final CRN according to an exemplary embodiment of the present invention. As described before, a final CRN should be determined for selecting an optimal path.

Referring to FIG. 5, the first QUERY MESSAGE with CoA 1 sent from the MN is delivered to CRN 3 through CRN 1 and CRN 2. The second QUERY MESSAGE with CoA 2 sent from the MN is delivered to CRN 3 through CRN 2. The third QUERY MESSAGE with CoA 3 sent from the MN is delivered to CRN 3.

CRN 1, CRN 2 and CRN 3 determine whether they are a final CRN by referring to related information set in the received QUERY MESSAGEs. The related information includes a CRN Discovery flag (CD flag) and a position ID on path.

The CD flag provides the number of wireless network interfaces of the MN, specifically, the number of paths in which the QUERY MESSAGEs travel, and the index of the path in which a QUERY MESSAGE with the CD flag travels. Since three paths are shown in FIG. 5, the CD flag is set to 3 in all of the QUERY MESSAGEs.

The position ID on the path indicates how many CRNs have received the QUERY MESSAGE so far in the path. The position ID on the path can be a numeral or an English letter. For instance, the first CRN that has received the QUERY MESSAGE sets the position ID on the path to 1 or F, the second CRN that has received the QUERY MESSAGE sets the position ID on the path to 2 or M, and the third CRN that has received the QUERY MESSAGE sets the position ID on the path to 3 or L.

CRN 1 checks the CD flag and the position ID on path in the first QUERY MESSAGE and determines whether it is a final CRN for the first QUERY MESSAGE.

If determining that it is not a final CRN for the first QUERY MESSAGE, CRN 1 sets the position ID on the path to 1 or F because it is the first CRN that received the first QUERY MESSAGE, and forwards the first QUERY MESSAGE to CRN 2.

CRN 2 receives the first or second QUERY MESSAGE. CRN 2 checks the CD flag of the first or second QUERY MESSAGE and determines whether it is a final CRN for the first or second QUERY MESSAGE.

If determining that it is not a final CRN for the first or second QUERY MESSAGE, CRN 2 sets the position ID on the path in the first or second QUERY MESSAGE to an appropriate value and forwards the QUERY MESSAGE to CRN 3. For the first QUERY MESSAGE, CRN 2 sets the position ID on the path to 2 or M because it is the second CRN that has received the first QUERY MESSAGE.

CRN 3 receives the first, second, or third QUERY MESSAGE and checks the CD flag in the first, second, or third QUERY MESSAGE. Then CRN 3 determines whether it is the final CRN for the first, second, or third QUERY MESSAGE.

Since a value that CRN 3 will write in the position ID on the path is identical to the CD flag in the first QUERY MESSAGE, CRN 3 determines that it is the final CRN for the first, second, or third QUERY MESSAGE. The value is 3 or L, indicating that CRN 3 is the third CRN that has received the first QUERY MESSAGE.

In the mean time, CRN 3 also determines that it is a final CRN for the second and third QUERY MESSAGEs with the same source address as set in the first QUERY MESSAGE. Therefore, CRN 3 can select an optimal path using the first, second, and third QUERY MESSAGEs.

The above description can be summarized to Table 3 below.

TABLE 3

| CoA | CD flag | CRN 1 | CRN 2 | CRN 3 |
|-----|---------|-------|-------|-------|
| CoA 1 | (v/3) | F | M | L |
| CoA 2 | (v/3) |   | F | M |
| CoA 3 | (v/3) |   |   | F |

As noted from Table 3, the CD flag is commonly set to 3 in the first, second, and third QUERY MESSAGEs. In the first QUERY MESSAGE, the position ID on the path is set to F by CRN 1, M by CRN 2, and L by CRN 3. In the second QUERY MESSAGE, the position ID on the path is set to F by CRN 2 and M by CRN 3. In the third QUERY MESSAGE, the position ID on the path is set to F by CRN 3.

b. Resource Reservation

Figure 6:
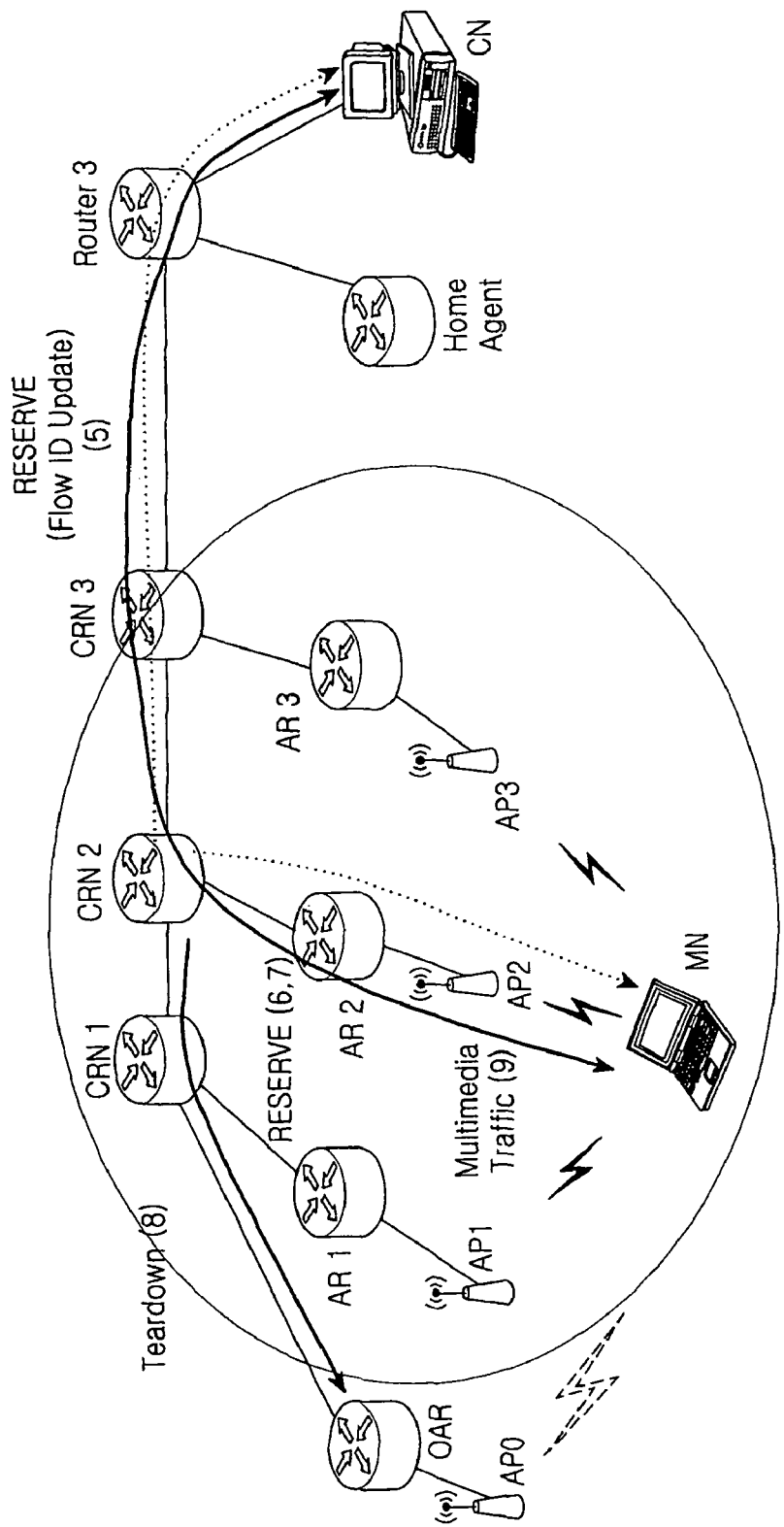
FIG. 6 illustrates an operation for reserving resources to establish the optimal path according to the exemplary embodiment of the present invention.

FIG. 6 illustrates an operation for reserving resources to establish the optimal path according to an exemplary embodiment of the present invention. In FIG. 6, it is understood that the three ARs AR 1, AR 2, and AR 3 exist within the new cell and the optimal path runs through AR 2.

Referring to FIG. 6, CRN 2 sends a RESERVE MESSAGE to AR 2 in the optimal path. The RESERVE MESSAGE can be sent using CoA 2 as with the optimal path selection. Before sending the RESERVE MESSAGE, CRN 2 reserves resources for the optimal path.

Upon receipt of the RESERVE MESSAGE, AR 2 reserves resources for the optimal path and forwards the RESERVE MESSAGE to the MN. Thus, the MN is aware that the path with CoA 2 is the optimal path and resources have been reserved for the optimal path.

In the mean time, CRN 2 sends a RESERVE MESSAGE to the CN. The resource reservation status between CRN 2 and the CN is updated according to the RESERVE MESSAGE. That is, a flow ID is updated using the CoA. The flow ID identifies a data communication path, composed of a sender address and a receiver address. Also, resources are reserved for a path between CRN 2 and the CN according to the RESERVE MESSAGE.

CRN 2 sends a TEARDOWN MESSAGE in an old path. Hence, routers including the OAR existing in the old path are released from a resource reservation status. As a consequence, resources are no longer reserved for the old path.

Therefore, resources are allocated for a new path between CRN 2 and the MN and resources allocated for an old path between CRN 2 and the CN are maintained. Resources for an old path between the OAR and CRN 2 are released.

While it has been described above that the CRN corresponding to the optimal path reserves resources for establishing the optimal path, it can be further contemplated that the final CRN which chose the optimal path carries out resource reservation for the optimal path setup. If the resource reservation using the CoA of the optimal path is failed, resources are reserved using the CoA corresponding to the second-best path.

c. Signaling for Optimal Path Setup

Figure 7:
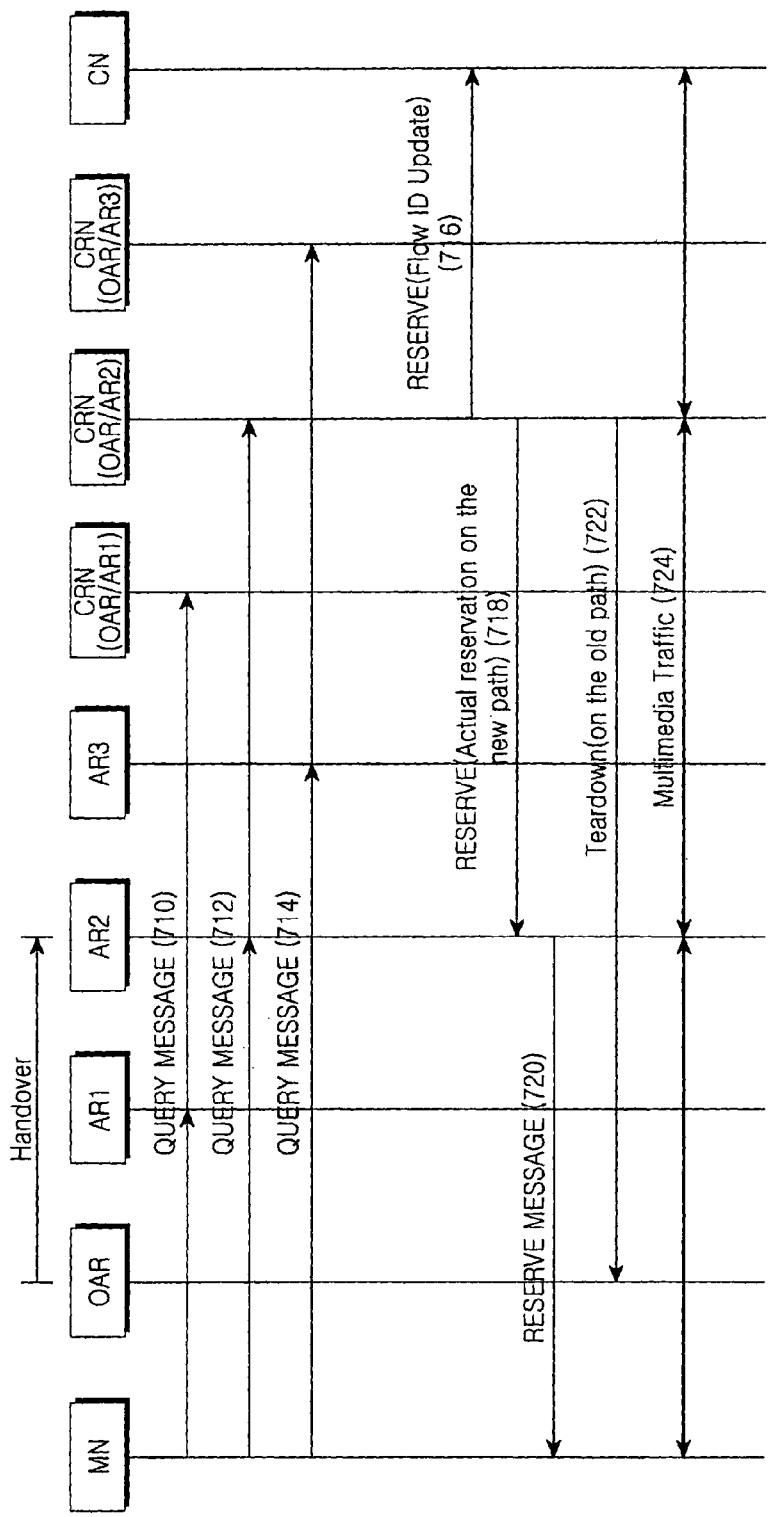
FIG. 7 is a diagram illustrating a signal flow for establishing the optimal path in the mobile network under the multi-homed environment according to an exemplary embodiment of the present invention.

FIG. 7 is a diagram illustrating a signal flow for establishing the optimal path in the mobile network under the multihomed environment according to an exemplary embodiment of the present invention.

Referring to FIG. 7, the first QUERY MESSAGE with CoA 1 sent from the MN travels in a first path running to CRN 3 through AR 1, CRN 1, and CRN 2 in step 710. During the propagation, available resource information regarding the first path is written in the first QUERY MESSAGE. The available resource information is written by a router having minimum available resources among routers existing in the first path.

The second QUERY MESSAGE with CoA 2 that is sent from the MN travels in a second path running to CRN 3 through AR 2 and CRN 2 in step 712. During the propagation, available resource information regarding the second path is written in the second QUERY MESSAGE. The available resource information is written by a router having minimum available resources among routers existing in the second path.

The third QUERY MESSAGE with CoA 3 sent from the MN travels in a third path running to CRN 3 through AR 3 in step 714. During the propagation, available resource information regarding the third path is written in the third QUERY MESSAGE. The available resource information is written by a router having minimum available resources among routers existing in the third path.

When needed, the first, second, and third QUERY MESSAGEs may include a bandwidth requested by the MN. Also, routers existing in the first, second, and third paths may write information confirming reception of a QUERY MESSAGE in the QUERY MESSAGE.

Upon receipt of the first, second, and third QUERY MESSAGEs, CRN 3 selects an optimal path based on the available resource information of the first, second, and third paths. Preferably but not necessarily, CRN 3 selects a path that can offer a maximum bandwidth as the optimal path. At the same, CRN 3 may additionally consider the arrival order of the QUERY MESSAGEs in selecting the optimal path.

Then the CRN corresponding to the optimal path (CRN 2 in FIG. 7) reserves resources for the optimal path. For this purpose, CRN 2 sends a RESERVE MESSAGE to the CN in step 716. By this RESERVE MESSAGE, the resource reservation status between CRN 2 and the CN is updated. That is, a flow ID is updated using the CoA. The flow ID identifies a data communication path, composed of a sender address and a receiver address. Therefore, resources are reserved for the path between CRN 2 and the CN according to the RESERVE MESSAGE.

In step 718, CRN 2 sends a RESERVE MESSAGE to AR 2 residing in the optimal path. For the transmission of the RESERVE MESSAGE, CoA 2 can be used, as with the optimal path determination. In the mean time, CRN 2 reserves resources for the optimal path before sending the RESERVE MESSAGE.

AR 2 reserves resources for the optimal path and forwards the RESERVE MESSAGE to the MN in step 720. Thus, the MN is aware that the path with CoA 2 is the optimal path and resources have been reserved for the optimal path.

CRN 2 sends a TEARDOWN MESSAGE through the old path established before the handover in step 722. Routers including the OAR existing in the old path are released from their resource reservation status. Thus, resources are no longer reserved for the old path.

Resources are allocated for the new path between CRN 2 and the MN, and resources for an old path between CRN 2 and the CN are maintained. Resources are released from the old path between the OAR and CRN 2. In step 724, the MN sends/receives multimedia traffic in the optimal path including AR 2 and CRN 3 (OAR/AR2).

A-2. Setup of Additional Path

Now a detailed description will be made for establishing an additional path in addition to the already-established optimal path in the mobile network under the multi-homed environment according to an exemplary embodiment of the present invention.

The additional path setup is divided into selection of an additional path from among the other paths, except for the optimal path, and setup of the additional path by reserving resources for the additional path. The additional path setup leads to load sharing between the established paths.

Figure 8:
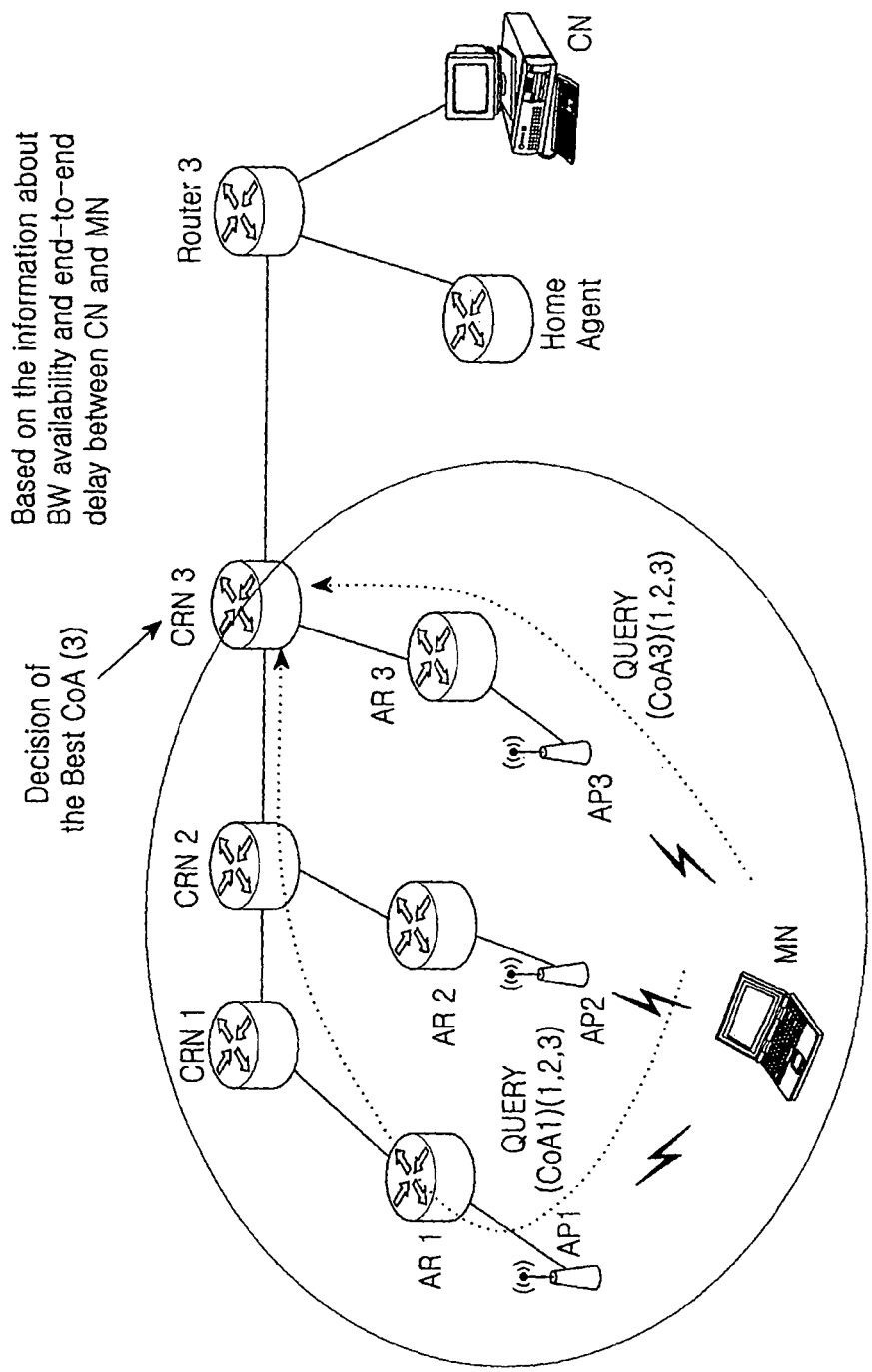
FIG. 8 illustrates an operation for establishing an additional path for load sharing according to an exemplary embodiment of the present invention.

FIG. 8 illustrates an operation for establishing an additional path for load sharing according to an exemplary embodiment of the present invention. In the illustrated case FIG. 8, resources have been reserved for the optimal path with CoA 2 and an additional path can be selected between the path with CoA 1 and the path with CoA 3.

Referring to FIG. 8, the MN sends QUERY MESSAGEs to AR 1 and AR 3 in the two paths except for the optimal path. Each of the QUERY MESSAGEs has a CoA to identify a path in which it travels. A first QUERY MESSAGE sent to AR 1 includes CoA 1 and a third QUERY MESSAGE sent to AR 3 includes CoA 3.

The first QUERY MESSAGE sent to AR 1 is delivered to the final CRN, CRN 3 via CRN 1, and the third QUERY MESSAGE sent to AR 3 is delivered to CRN 3. Upon receipt of the QUERY MESSAGEs, CRN 3 determines an additional path based on available resource information set in the QUERY MESSAGEs. Available resource information for a path indicates the minimum of bandwidths that ARs existing in the path can allocate. CRN 3 selects a path that offers a maximum bandwidth or satisfies an MN-requested bandwidth as an additional path.

CRN 3 may further consider the arrival order of the QUERY MESSAGEs in selecting the additional path. Yet, the consideration is viable on the premise that the requested bandwidth is known to CRN 3. For example, the QUERY MESSAGEs should inform the requested bandwidth of the MN. When a plurality of paths offers the same bandwidth or satisfies the requested bandwidth, the arrival order is considered.

Figure 10:
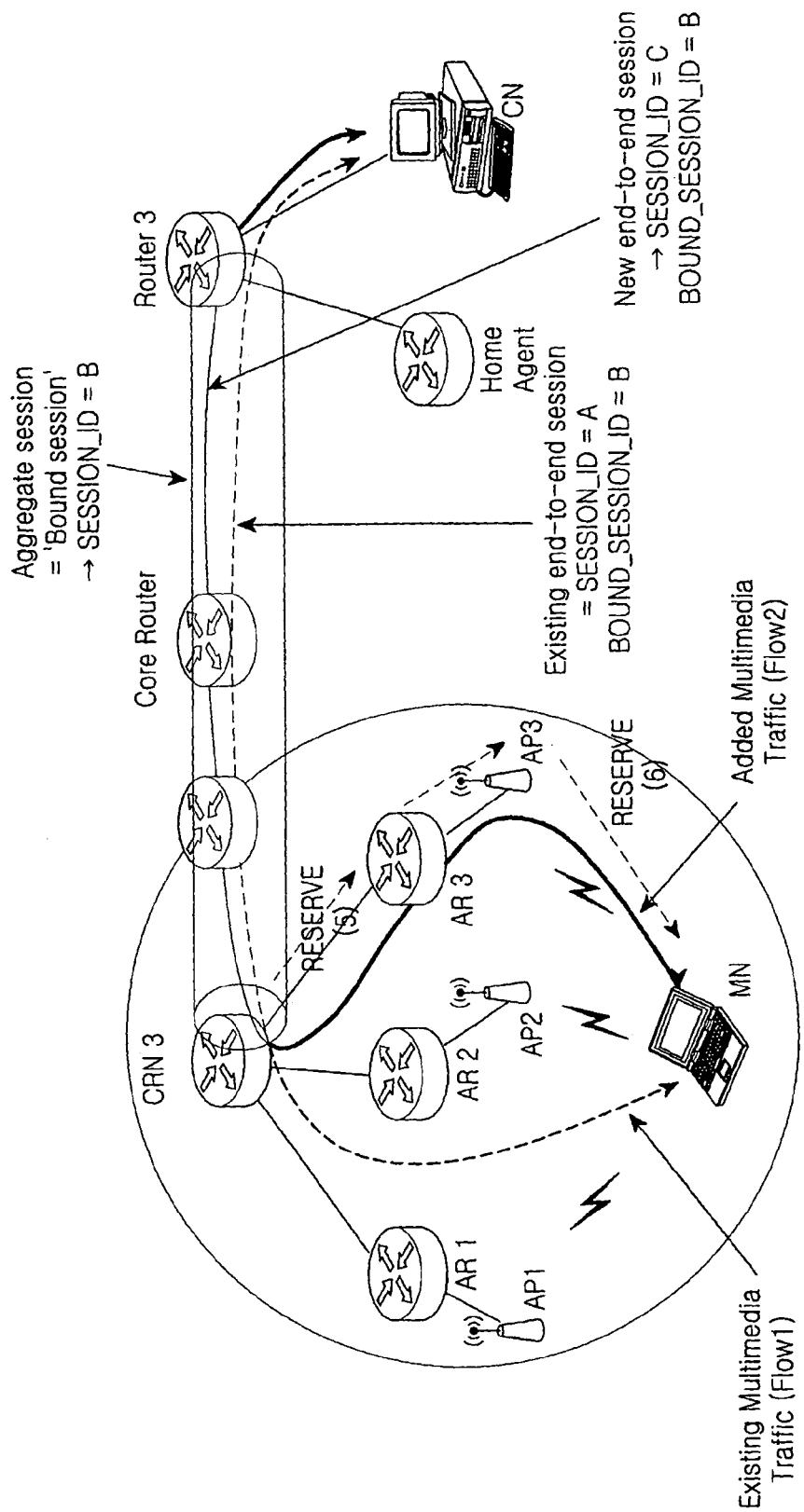
FIG. 10 illustrates an operation for establishing the additional path according to an exemplary embodiment of the present invention.

After the additional path is selected, it is established in a procedure illustrated in FIG. 10.

Referring to FIG. 10, the CRN 3 corresponding to the additional path sends a RESERVE MESSAGE to AR 3 in the additional path. As with the additional path selection, CoA 3 can be used for the transmission of the RESERVE MESSAGE. Meanwhile, CRN 3 reserves resources for the additional path before sending the RESERVE MESSAGE.

Upon receipt of the RESERVE MESSAGE, AR 3 reserves resources for the additional path and forwards the RESERVE MESSAGE to the MN. Thus, the MN is aware that the path with CoA 3 is the additional path and resources have been reserved for the additional path.

In the mean time, CRN 3 sends a RESERVE MESSAGE to the CN. The resource reservation status between CRN 3 and the CN is updated according to the RESERVE MESSAGE. That is, a flow ID is updated using CoA 3. Also, resources are reserved for a path between CRN 3 and the CN according to the RESERVE MESSAGE.

If the resource reservation using the CoA of the added path has failed, resources are reserved using a CoA corresponding to the second-best path.

Figure 9:
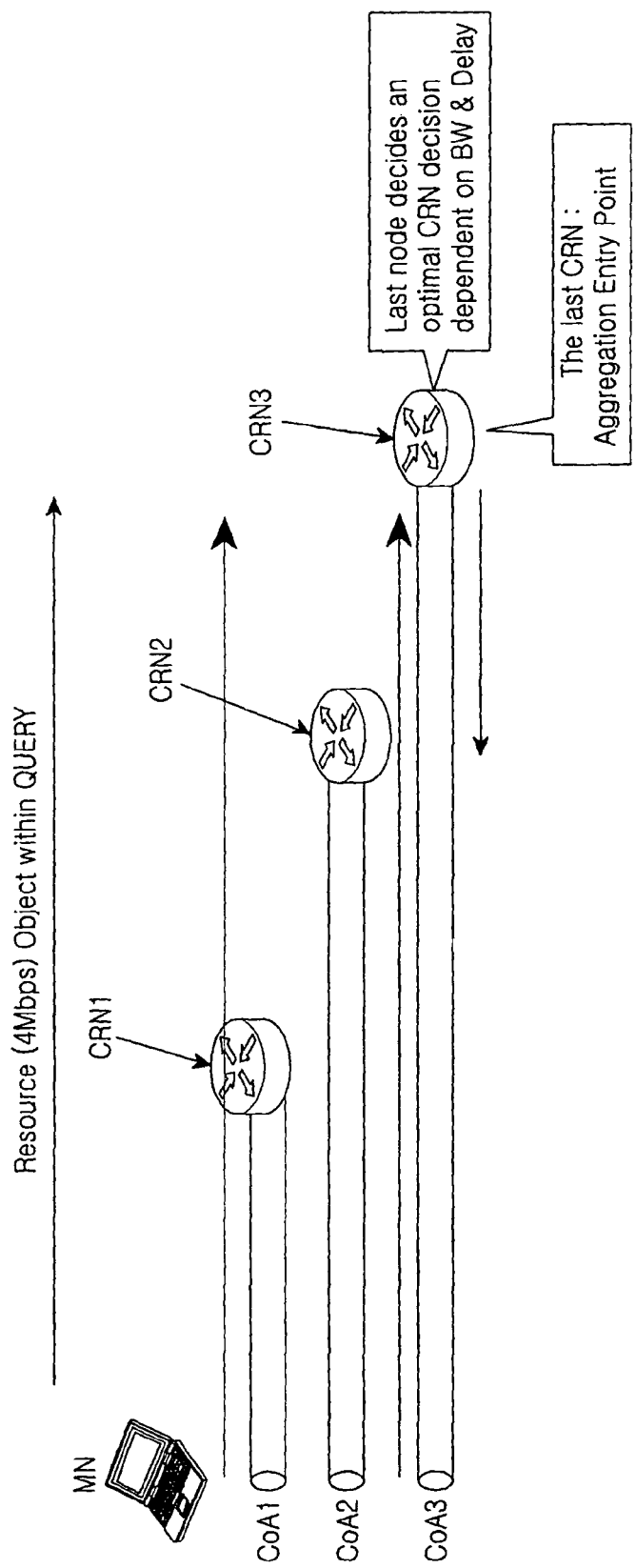
FIG. 9 illustrates an example of determining a final CRN for selecting the additional path.

FIG. 9 illustrates an example of determining a final CRN for selecting the additional path. As described before, the final CRN must be determined in order to select the additional path.

Referring to FIG. 9, the first QUERY MESSAGE with CoA 1 sent from the MN is delivered to CRN 3 through CRN 1 and CRN 2. The third QUERY MESSAGE with CoA 3 sent from the MN is delivered to CRN 3.

CRN 1 and CRN 3 determine whether they are the final CRN referring to related information set in the received QUERY MESSAGEs. The related information includes a CD flag and a position ID on path.

The CD flag provides the number of paths in which the QUERY MESSAGEs travel and the index of the path in which a QUERY MESSAGE with the CD flag travels. Since two paths are assumed in FIG. 9, the CD flag is set to 2 in both the QUERY MESSAGEs.

The position ID on the path indicates how many CRNs have received the QUERY MESSAGE so far in the path. The position ID on the path can be a numeral or an English letter. For instance, the first CRN that has received the QUERY MESSAGE sets the position ID on path to 1 or F, the second CRN that has received the QUERY MESSAGE sets the position ID on path to 2 or M, and the last CRN that has received the QUERY MESSAGE sets the position ID on path to 3 or L.

CRN 1 checks the CD flag and the position ID on path in the first QUERY MESSAGE with CoA 1 and determines whether it is a final CRN for the first QUERY MESSAGE.

If determining that it is not a final CRN for the first QUERY MESSAGE, CRN 1 sets the position ID on path to 1 or F and forwards the first QUERY MESSAGE to CRN 3 via CRN 2.

CRN 3 receives the first or third QUERY MESSAGE and checks the CD flag in the first or third QUERY MESSAGE. Then CRN 3 determines whether it is a final CRN for the first or third QUERY MESSAGE.

Since the value that CRN 3 will write in the position ID on path of the first QUERY MESSAGE with CoA 1 is identical to the CD flag of the first QUERY MESSAGE, CRN 3 determines that it is the final CRN for the first or third QUERY MESSAGE. The value is 3 or L, indicating that CRN 3 is the third CRN that has received the QUERY MESSAGE with CoA 1.

For the third QUERY MESSAGE with CoA 3, CRN 3 also determines that it is the final CRN because the third QUERY MESSAGE has the same source address as set in the first QUERY MESSAGE. Thus, CRN 3 can select the additional path according to the QUERY MESSAGEs.

The above operation can be summarized to Table 4 below.

TABLE 4

| CoA | CD flag | CRN 1 | CRN 2 | CRN 3 |
| --- | --- | --- | --- | --- |
| CoA 1 | (v/3) | F | | L |
| CoA 2 | | | | |
| CoA 3 | (v/3) | | | F |

As noted from Table 4, the CD flag is commonly set to 2 in the QUERY MESSAGEs. In the first QUERY MESSAGE with CoA 1, the position ID on the path is set to F by CRN 1 and L by CRN 3. In the third QUERY MESSAGE with CoA 3, the position ID on the path is set to F by CRN 3.

When the additional path is established in the afore-described operation, the MN processes traffic in a distributed manner using the bandwidths reserved for the optimal path and the additional path.

Figure 11:
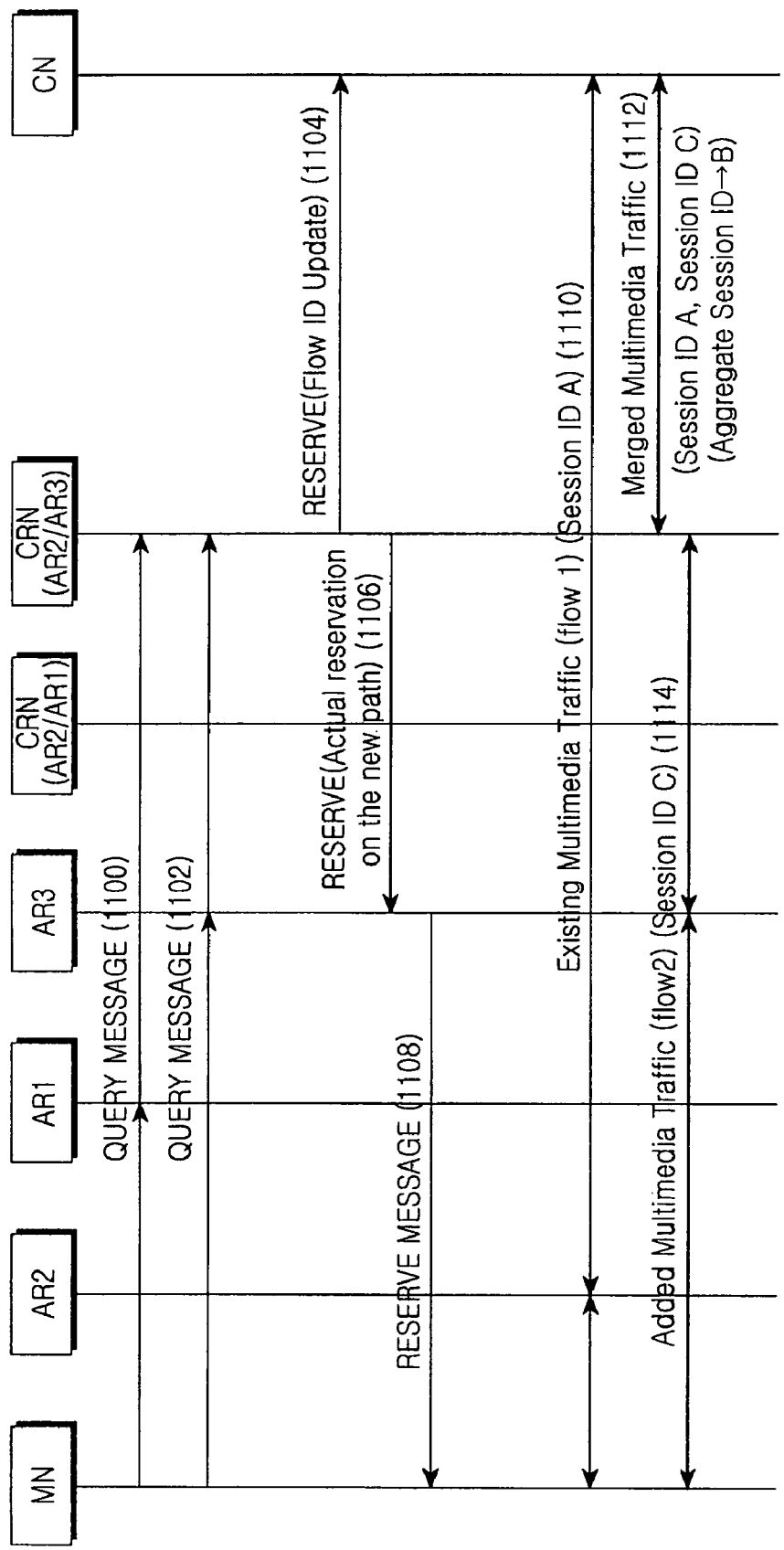
FIG. 11 is a diagram illustrating a signal flow for establishing the additional path in the mobile network under the multi-homed environment according to an exemplary embodiment of the present invention.

FIG. 11 is a diagram illustrating a signal flow for establishing the additional path in the mobile network under the multi-homed environment according to an exemplary embodiment of the present invention.

Referring to FIG. 11, the first QUERY MESSAGE with CoA 1 sent from the MN travels in the first path running to CRN 3 through AR 1 in step 1100. During the propagation, available resource information regarding the first path is written in the first QUERY MESSAGE. The available resource information is written by a router having the minimum available resources among routers existing in the first path.

Because the second path running to CRN 3 through AR 2 is in use as the optimal path, a QUERY MESSAGE is not sent in the second path.

The third QUERY MESSAGE with CoA 3 sent from the MN travels in the third path running to CRN 3 through AR 3 in step 1102. During the propagation, the available resource information regarding the third path is written in the third QUERY MESSAGE. The available resource information is written by a router having minimum available resources among routers existing in the third path.

When needed, the first and third QUERY MESSAGEs may include a bandwidth requested by the MN. Also, routers existing in the first and third paths may write information confirming reception of a QUERY MESSAGE in the QUERY MESSAGE.

Upon receipt of the first and third QUERY MESSAGEs, CRN 3 selects an additional path based on the available resource information of the first and third paths. Preferably, but not necessarily, CRN 3 selects a path that can offer a maximum bandwidth as the additional path. At the same, CRN 3 may additionally consider the arrival order of the QUERY MESSAGEs in selecting the additional path.

Then CRN 3 reserves resources for the additional path. For this purpose, CRN 3 sends a RESERVE MESSAGE to the CN in step 1104. By this RESERVE MESSAGE, the resource reservation status between CRN 3 and the CN is updated. That is, a flow ID is updated using the CoA. The flow ID identifies a data communication path, composed of a sender address and a receiver address. Therefore, resources are reserved for the path between CRN 3 and the CN according to the RESERVE MESSAGE.

In step 1106, CRN 3 sends a RESERVE MESSAGE to AR 3 residing in the additional path. For the transmission of the RESERVE MESSAGE, CoA 3 can be used, as with the additional path determination. In the mean time, CRN 3 reserves resources for the additional path before sending the RESERVE MESSAGE.

AR 2 determines a flow ID and a session ID for processing traffic in the already-established optimal path and provides the flow ID and the session ID to the MN and the CN in step 1110. In FIG. 11, the flow ID and the session ID for the optimal path are flow 1 and A, respectively.

AR 3 determines a flow ID and a session ID for processing traffic in the additional path and provides the flow ID and the session ID to the MN and CRN 3 in step 1114. In FIG. 11, the flow ID and the session ID for the additional path are flow 2 and C, respectively.

Meanwhile, CRN 3 sets a bound session ID to B for use between CRN 3 and the CN. Therefore, traffic is processed using the bound session ID, B between CRN 3 and the CN.

A-3. Setup of Multiple Paths

How multiple paths are established to process traffic in a distributed manner in a mobile network under a multi-homed environment according to the exemplary embodiment of the present invention will now be described.

In accordance with an exemplary embodiment of the present invention, the multiple path setup process is divided into selection of multiple paths selections and setup of the multiple paths setup by reserving resources for them.

Figure 12:
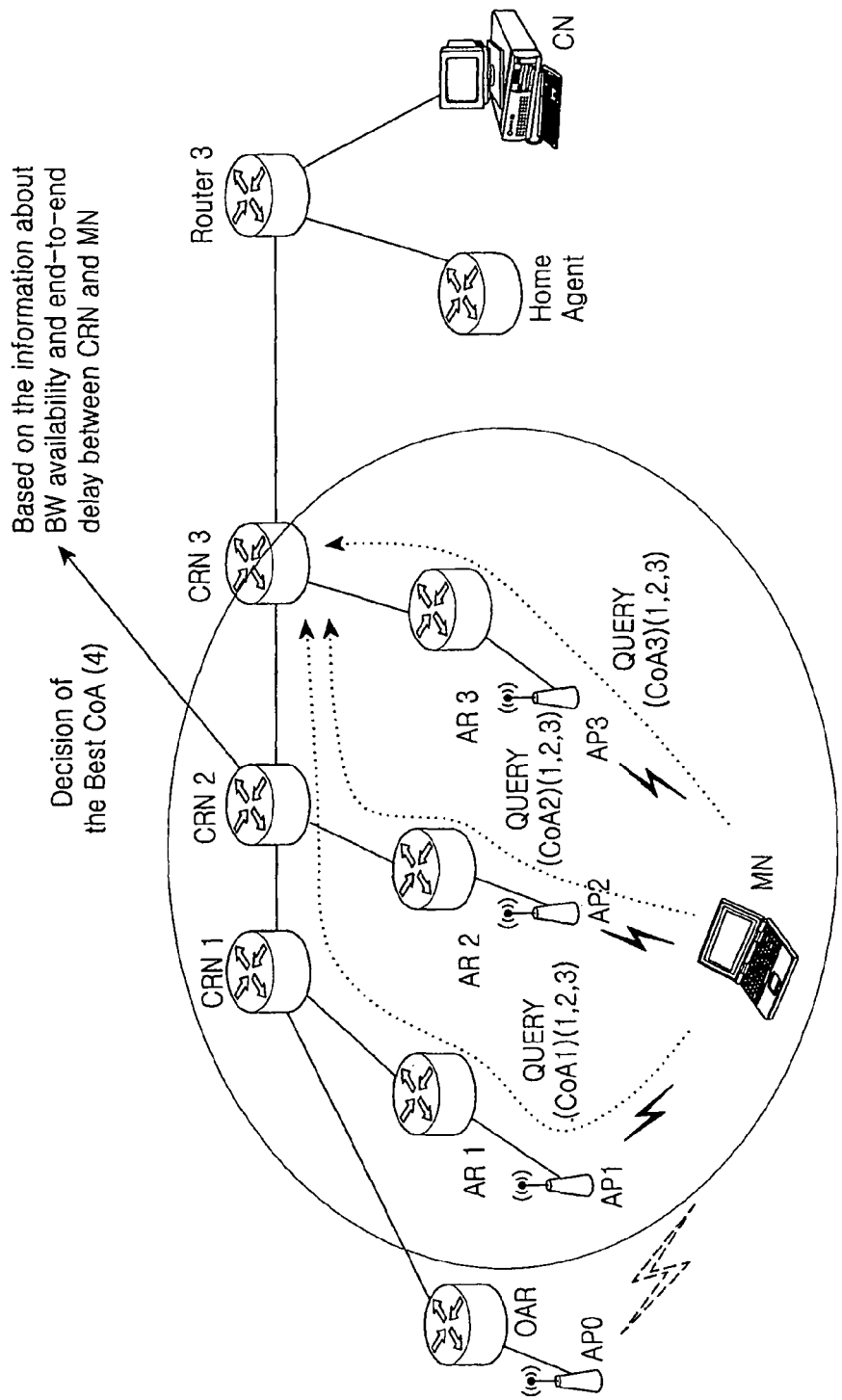
FIG. 12 illustrates an operation for selecting multiple paths in the mobile network under the multi-homed environment according to an exemplary embodiment of the present invention.

FIG. 12 illustrates an operation for selecting multiple paths in the mobile network under the multi-homed environment according to an exemplary embodiment of the present invention. In the illustrated case of FIG. 12, the MN performs a handover from the old cell to the new cell and the three ARs, AR 1, AR 2, and AR 3 exist in the new cell.

Referring to FIG. 12, the MN sends first, second, and third QUERY MESSAGEs to AR 1, AR 2, and AR 3. The first, second, and third QUERY MESSAGEs have CoA 1, CoA 2, and CoA 3, respectively.

The first, second, and third QUERY MESSAGEs are delivered to CRN 3. CRN 3 selects multiple paths based on available resource information set in the QUERY MESSAGEs. Available resource information for a path indicates the minimum of bandwidths that ARs existing in the path can allocate. CRN 3 determines a bandwidth for each of the selected multiple paths by prioritizing the multiple paths, such that the bandwidth satisfies an MN-requested bandwidth. A wide bandwidth is allocated to a relatively high-priority path and a narrow bandwidth to a relatively low-priority path.

Table 5 below is an example of bandwidth allocation to multiple paths, for a requested bandwidth of 8 Mbps.

TABLE 5

| CoA | Available resource information | Arrival order | Allocated bandwidth |
| --- | --- | --- | --- |
| CoA 2 | 5 Mbps | 1 | 4 Mbps |
| CoA 1 | 3 Mbps | 2 | 2 Mbps |
| CoA 3 | 2 Mbps | 3 | 2 Mbps |

Referring to Table 5, considering the available resource information and the arrival order, CoA 2, CoA 1, and CoA 3 are ranked in a descending order. Therefore, CRN 3 allocates 4 Mbps to CoA 2 and 2 Mbps to both CoA 1 and CoA 3.

Figure 13:
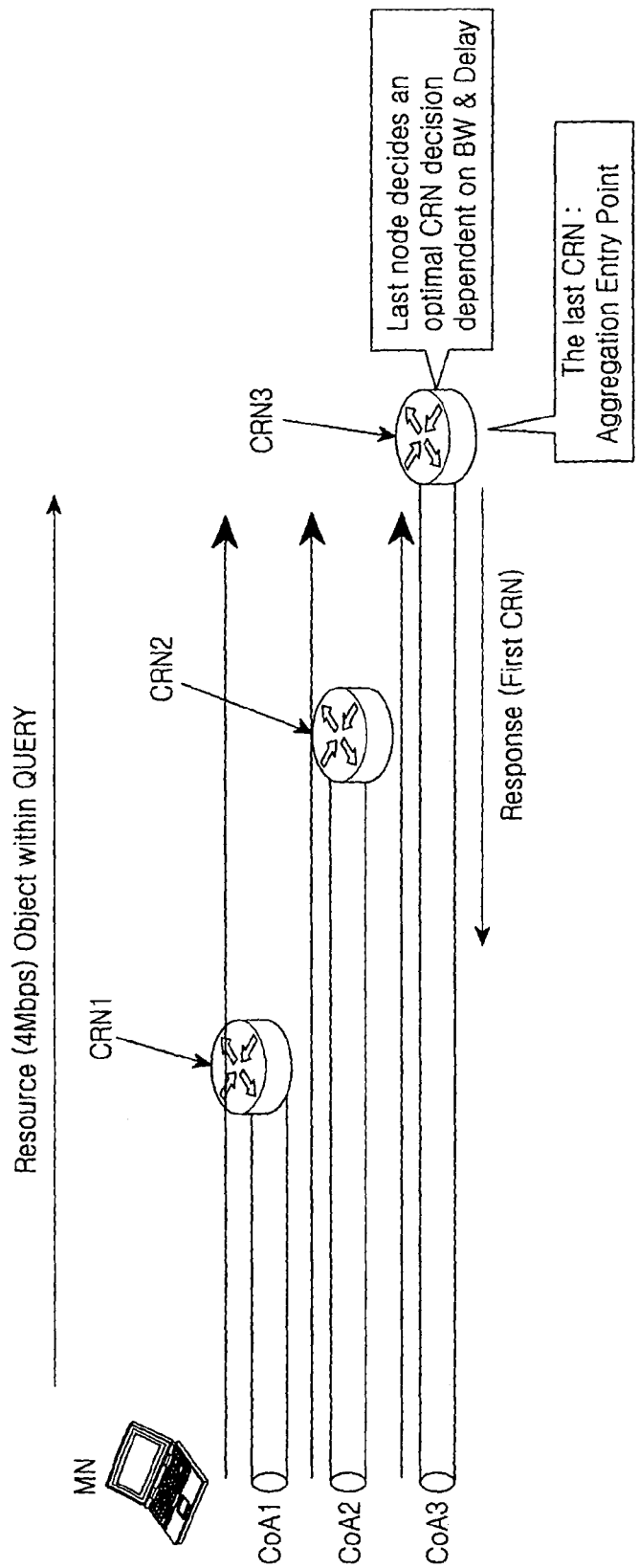
FIG. 13 illustrates an example of determining a final CRN for establishing the multiple paths according to an exemplary embodiment of the present invention.

FIG. 13 illustrates an example of determining a final CRN for establishing the multiple paths according to an exemplary embodiment of the present invention.

Referring to FIG. 13, the first QUERY MESSAGE with CoA 1 sent from the MN is delivered to CRN 3 through CRN 1 and CRN 2. The second QUERY MESSAGE with CoA 2 sent from the MN is delivered to CRN 3 through CRN 2. The third QUERY MESSAGE with CoA 3 sent from the MN is delivered to CRN 3. CRN 1, CRN 2, and CRN 3 determine whether they are a final CRN referring to related information set in the received QUERY MESSAGEs. The related information includes a CD flag and a position ID on the path.

CRN 1 checks the CD flag and the position ID on the path in the first QUERY MESSAGE and determines whether it is a final CRN for the first QUERY MESSAGE. If determining that it is not a final CRN for the first QUERY MESSAGE, CRN 1 sets the position ID on the path to 1 or F because it is the first CRN that received the first QUERY MESSAGE, and forwards the first QUERY MESSAGE to CRN 2.

CRN 2 receives the first or second QUERY MESSAGE. CRN 2 checks the CD flag of the first or second QUERY MESSAGE and determines whether it is a final CRN for the first or second QUERY MESSAGE.

If determining that it is not a final CRN of the first or second QUERY MESSAGE, CRN 2 sets the position ID on the path in the first or second QUERY MESSAGE to an appropriate value and forwards the QUERY MESSAGE to CRN 3. For the first QUERY MESSAGE, CRN 2 sets the position ID on the path to 2 or M because it is the second CRN that has received the first QUERY MESSAGE. For the second QUERY MESSAGE, CRN 2 sets the position ID on the path to 1 or F because it is the first CRN that has received the second QUERY MESSAGE.

CRN 3 receives the first, second, or third QUERY MESSAGE and checks the CD flag in the first, second, or third QUERY MESSAGE. Then CRN 3 determines whether it is the final CRN for the first, second, or third QUERY MESSAGE.

Since a value that CRN 3 will write in the position ID on the path is identical to the CD flag in the first QUERY MESSAGE, CRN 3 determines that it is a final CRN for the first, second, or third QUERY MESSAGE. The value is 3 or L, indicating that CRN 3 is the third CRN that has received the first QUERY MESSAGE.

CRN 3 also determines that it is the final CRN for the second and third QUERY MESSAGEs with the same source address as set in the first QUERY MESSAGE. Therefore, CRN 3 can select multiple optimal paths using the first, second, and third QUERY MESSAGEs.

The above description can be summarized to Table 6 below.

TABLE 6

| CoA | CD flag | CRN 1 | CRN 2 | CRN 3 |
|---|---|---|---|---|
| CoA 1 | (1/3) | F | M | L |
| CoA 2 | (2/3) |   | F | M |
| CoA 3 | (3/3) |   |   | F |

As noted from Table 6, the CD flag is commonly set to 3 in the first, second, and third QUERY MESSAGEs. In the first QUERY MESSAGE, the position ID on the path is set to by CRN 1, M by CRN 2, and L by CRN 3. In the second QUERY MESSAGE, the position ID on the path is set to F by CRN 2 and M by CRN 3. In the third QUERY MESSAGE, the position ID on the path is set to F by CRN 3.

Then CRN 3 sends RESERVE MESSAGEs through the selected multiple paths, specifically. RESERVE MESSAGEs with CoA 1, CoA 2, and CoA 3 through the first, second, and third paths. Routers existing in each of the multiple paths reserves resources corresponding to the determined bandwidth for the path according to the received RESERVE MESSAGE.

A session ID and a flow ID are given to each of the multiple paths. If the same application is provided through the multiple paths, the multiple paths have the same session ID and unique flow IDs. On the contrary, if each path has a different application, different session IDs and different flow IDs are given to the multiple paths. Therefore, the session ID and the flow IDs allocated to the multiple paths are used on a common path connecting the final CRN to the CN. This may increase traffic processing load.

To avert the problem, the final CRN aggregates first, second, and third flows of the first, second, and third paths. Accordingly, a new bound session ID is allocated to the aggregate flow.

Figure 14:
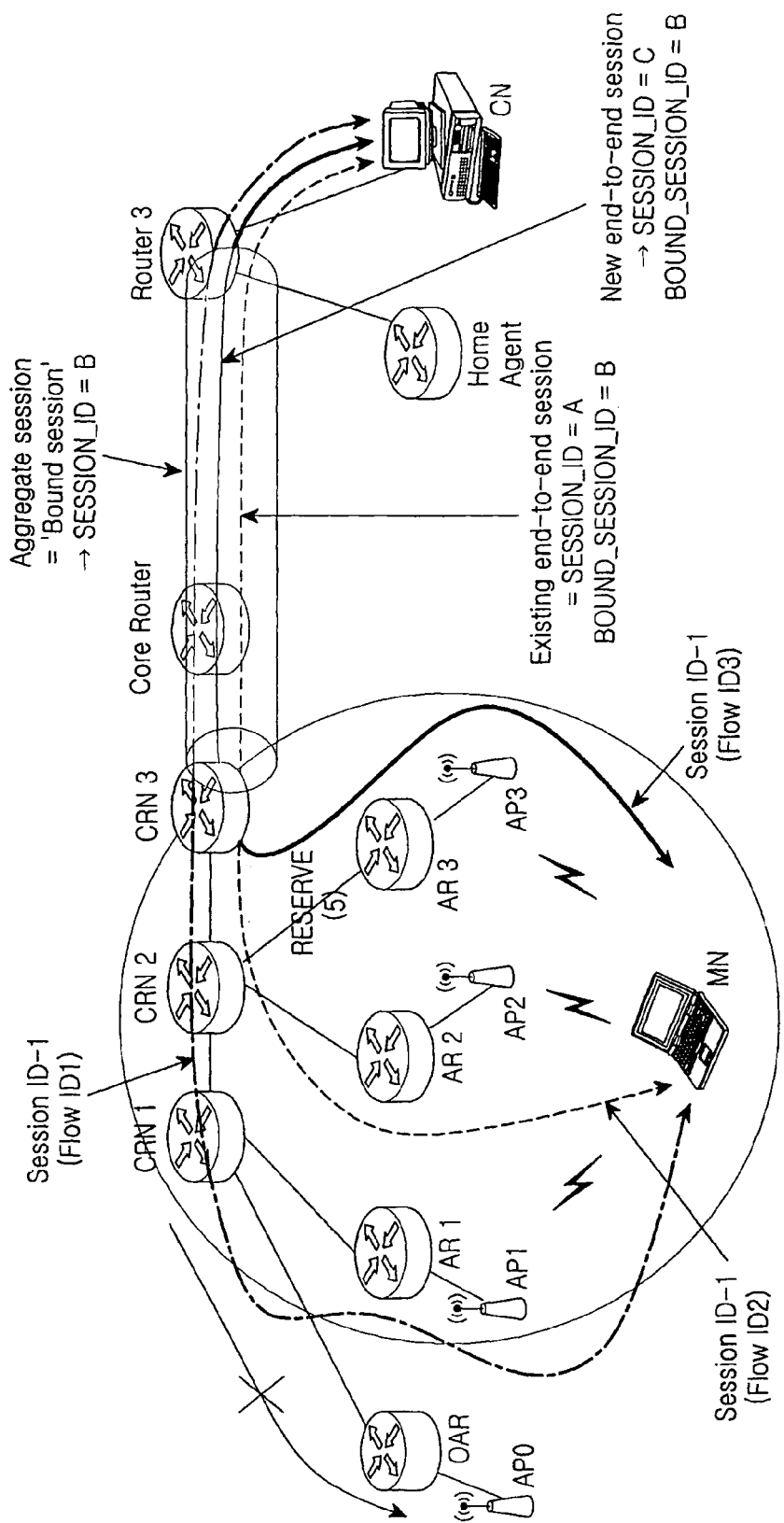
FIG. 14 illustrates an example of setting a bound session ID (BOUND_SESSION_ID) in the mobile network under the multi-homed environment in which traffic is processed through multiple paths.

FIG. 14 illustrates an example of setting a bound session ID (BOUND_SESSION_ID) in the mobile network under the multi-homed environment in which traffic is processed through multiple paths. In the illustrated case of FIG. 14, the same application is provided through the multiple paths. A session ID is a unique ID that identifies a session until the session is terminated.

Referring to FIG. 14, because the same application is provided in the multiple paths, the same session ID and a different flow ID are allocated to each path. Thus, the final CRN allocates a bound session ID (BOUND_SESSION_ID) to a common path between the final CRN and the CN. For instance, if the session ID is A for the first flow, C for the second flow, and D for the third flow, BOUND_SESSION_ID=B.

B. Embodiment 2

A sender-initiated (i.e. MN-initiated) resource allocation for at least one optimal path chosen from among a plurality of paths and, when needed, for an additional path will be described below in great detail.

As stated before, the sender-initiated resource allocation is the process of reserving resources by sending a RESERVE MESSAGE from the sender (i.e. MN) to the CN and receiving an ACK MESSAGE at the sender from the CN. The ACK MESSAGE is optional.

B-1. Setup of Optimal Path

How an optimal path is chosen from among a plurality of paths and established in a mobile network under a multi-homed environment according to another exemplary embodiment of the present invention will be described.

In accordance with the second exemplary embodiment of the present invention, the optimal path setup process is divided into optimal path selection and optimal path setup by reserving resources for the optimal path.

a. Optimal Path Selection

Figure 15:
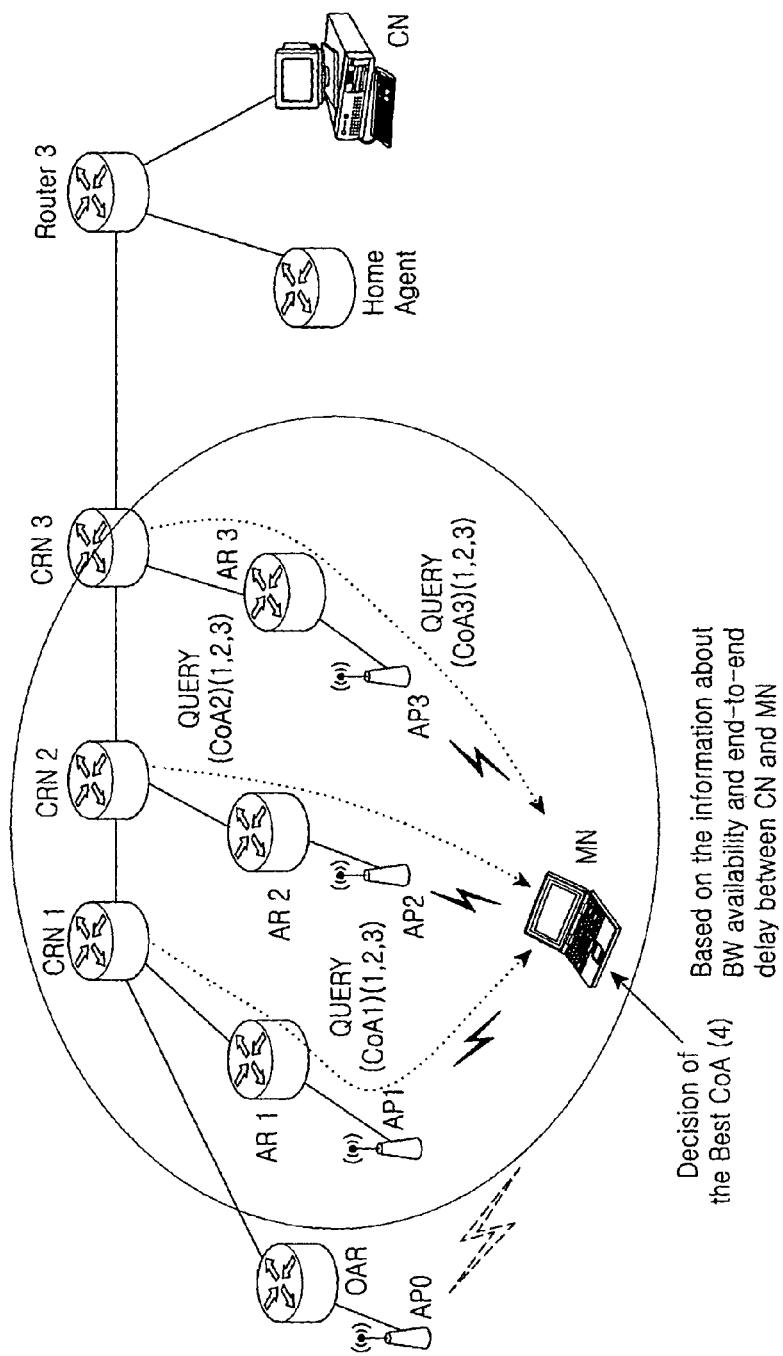
FIG. 15 illustrates an operation for selecting an optimal path in the mobile network under the multi-homed environment according to another exemplary embodiment of the present invention.

FIG. 15 illustrates an operation for selecting an optimal path in the mobile network under the multi-homed environment according to the second exemplary embodiment of the present invention. In the illustrated case of FIG. 15, the MN performs a handover from an old cell to a new cell and three accessible routers, specifically three ARs (AR 1, AR 2, and AR 3) exist in the new cell. A detailed description of an operation before the handover is not provided herein.

Referring to FIG. 15, CRN 1, CRN 2, and CRN 3 send QUERY MESSAGEs with different CoAs to the MN in different paths. It is assumed herein that a first QUERY MESSAGE sent from CRN 1 includes CoA 1, a second QUERY MESSAGE sent from CRN 2 includes CoA 2, and a third QUERY MESSAGE sent from CRN 3 includes CoA 3.

The first QUERY MESSAGE sent from CRN 1 is delivered to the MN via AR 1, the second QUERY MESSAGE sent from CRN 2 is delivered to the MN via AR 2, and the third QUERY MESSAGE sent from CRN 3 is delivered to the MN via AR 3.

Upon receipt of the QUERY MESSAGEs from the plurality of paths, the MN determines an optimal path based on available resource information set in the QUERY MESSAGEs. Available resource information for a path indicates the minimum of bandwidths that ARs existing in the path can allocate. The MN selects a path that satisfies its requested bandwidth as an optimal path.

The MN may further consider the arrival order of the QUERY MESSAGEs in selecting the optimal path, when a plurality of paths can satisfy the requested bandwidth. In this case, a path from which the first QUERY MESSAGE arrives at the MN is chosen as the optimal path, which implies that the path offers the shortest transmission delay.

b. Resource Reservation

Figure 16:
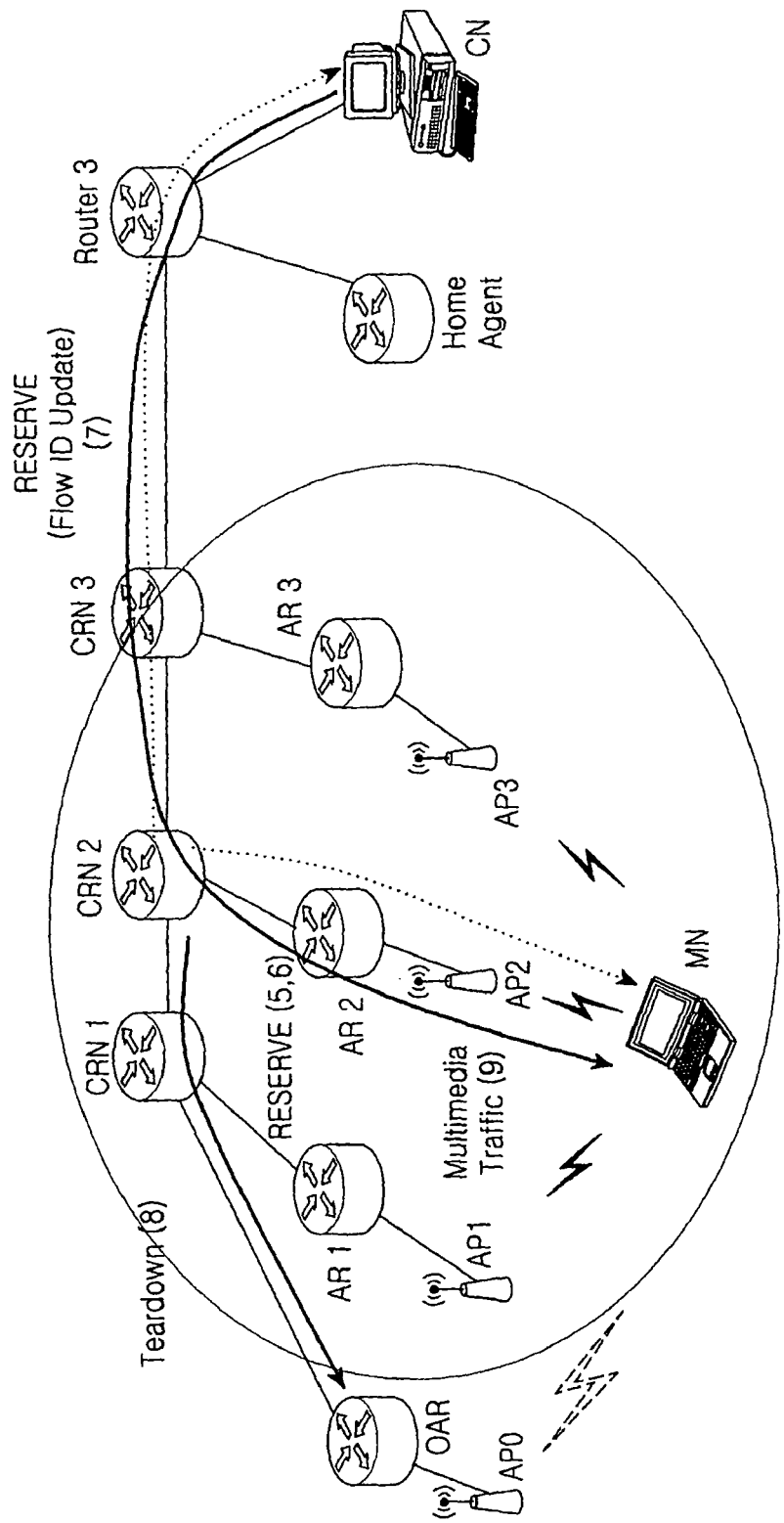
FIG. 16 illustrates an operation for reserving resources to establish the optimal path according to an exemplary embodiment of the present invention.

FIG. 16 illustrates an operation for reserving resources to establish the optimal path according to the second exemplary embodiment of the present invention. In FIG. 16, it is assumed that the three ARs (AR 1, AR 2 and AR 3) exist within the new cell and the optimal path runs through AR 2.

Referring to FIG. 16, the MN sends a RESERVE MESSAGE to AR 2 in the optimal path. The RESERVE MESSAGE can be sent using CoA 2 as with the optimal path selection.

Upon receipt of the RESERVE MESSAGE, AR 2 reserves resources for the optimal path and forwards the RESERVE MESSAGE to CRN 2. Thus, CRN 2 is aware that the path with CoA 2 is the optimal path.

In the mean time, CRN 2 sends a RESERVE MESSAGE to the CN. The resource reservation status between CRN 2 and the CN is updated according to the RESERVE MESSAGE. That is, a flow ID is updated using the CoA. The flow ID identifies a data communication path, composed of a sender address and a receiver address. Also, resources are reserved for a path between CRN 2 and the CN according to the RESERVE MESSAGE.

CRN 2 sends a TEARDOWN MESSAGE in an old path established before the handover. Hence, routers including an OAR existing in the old path are released from a resource reservation status. As a consequence, resources are no longer reserved for the old path.

Therefore, resources are allocated for a new path between CRN 2 and the MN and resources allocated for an old path between CRN 2 and the CN are maintained. Resources for an old path between the OAR and CRN 2 are released.

c. Signaling for Optimal Path Setup

Figure 17:
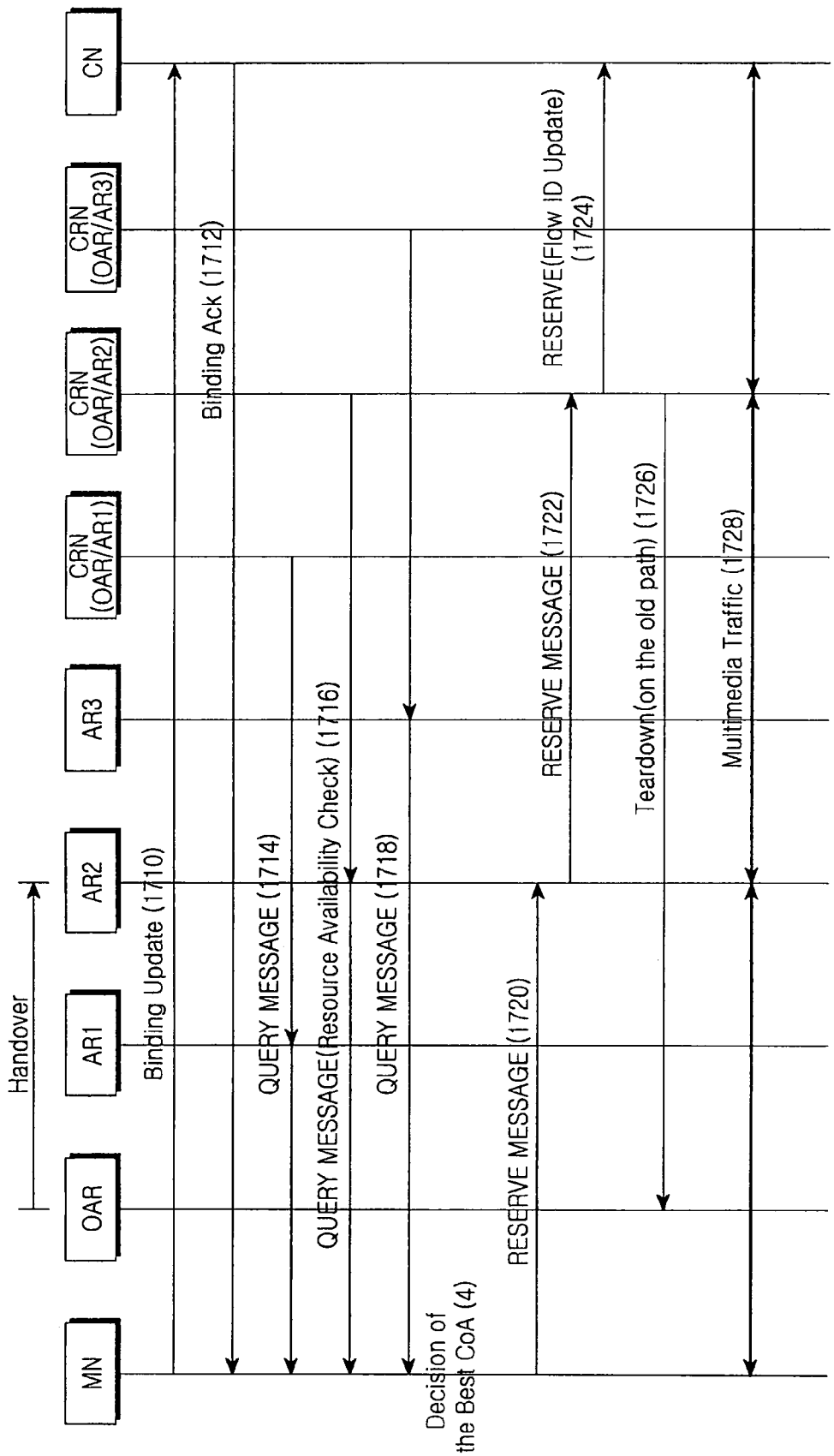
FIG. 17 is a diagram illustrating a signal flow for establishing the optimal path in the mobile network under the multi-homed environment according to the second exemplary embodiment of the present invention.

FIG. 17 is a diagram illustrating a signal flow for establishing the optimal path in the mobile network under the multi-homed environment according to the second exemplary embodiment of the present invention.

Referring to FIG. 17, the last process of the handover, i.e. Binding Update is performed in steps 1710 and 1712. The first, second, and third QUERY MESSAGEs sent from CRN 1, CRN 2, and CRN 3 are delivered to the MN in first, second, and third paths in steps 1714, 1716, and 1718.

The first QUERY MESSAGE with CoA 1 sent from CRN 1 travels to the MN via AR 1 in the first path. During the propagation, the available resource information regarding the first path is written in the first QUERY MESSAGE. The available resource information is written by a router having the minimum available resources among the routers existing in the first path.

The second QUERY MESSAGE with CoA 2 sent from CRN 2 travels to the MN via AR 2 in the second path. During the propagation, available resource information regarding the second path is written in the second QUERY MESSAGE. The available resource information is written by a router having the minimum available resources among the routers existing in the second path.

The third QUERY MESSAGE with CoA 3 sent from CRN 3 travels to the MN via AR 3 in the third path. During the propagation, the available resource information regarding the third path is written in the third QUERY MESSAGE. The available resource information is written by a router having the minimum available resources among the routers existing in the third path.

Routers existing in the first, second, and third paths may write information confirming reception of a QUERY MESSAGE in the QUERY MESSAGE.

Upon receipt of the first, second, and third QUERY MESSAGEs, MN selects an optimal path based on the available resource information of the first, second, and third paths. Preferably, but not necessarily, MN selects a path that can offer a maximum bandwidth as the optimal path. At the same, MN may additionally consider the arrival order of the QUERY MESSAGEs in selecting the optimal path.

Then resources are reserved for the optimal path. For this purpose, MN sends a RESERVE MESSAGE to AR 2 in step 1720. For the transmission of the RESERVE MESSAGE, CoA 2 can be used, as with the optimal path determination.

AR 2 reserves resources for the optimal path and forwards the RESERVE MESSAGE to CRN 2 in step 1722. Thus, CRN 2 reserves resources for the optimal path.

In the mean time, CRN 2 sends a RESERVE MESSAGE to the CN in step 1724. According to the RESERVE MESSAGE, the resource reservation status between CRN 2 and the CN is updated. That is, a flow ID is updated using the CoA. The flow ID identifies a data communication path, composed of a sender address and a receiver address. Also, resources are reserved for the path between CRN 2 and the CN according to the RESERVE MESSAGE.

CRN 2 sends a TEARDOWN MESSAGE through the old path established before the handover in step 1726. Hence, routers including the OAR existing in the old path are released from their resource reservation status. Thus, resources are no longer reserved for the old path.

In this way, resource reservation is completed for the new path between CRN 2 and the MN, and resources for an old path between CRN 2 and the CN are maintained. Resource reservation for the old path between the OAR and CRN 2 is cancelled. In step 1728, the MN sends/receives multimedia traffic using COA 2 in the optimal path including AR 2 and CRN 3 (OAR/AR2).

B-2. Setup of Additional Path

Now a detailed description will be made of establishing an additional path in addition to the already-established optimal path in the mobile network under the multi-homed environment according to the second exemplary embodiment of the present invention.

The additional path setup is divided into selection of an additional path from among the other the paths except for the optimal path and setup of the additional path by reserving resources for the additional path. The additional path setup leads to load sharing between the established paths.

Figure 18:
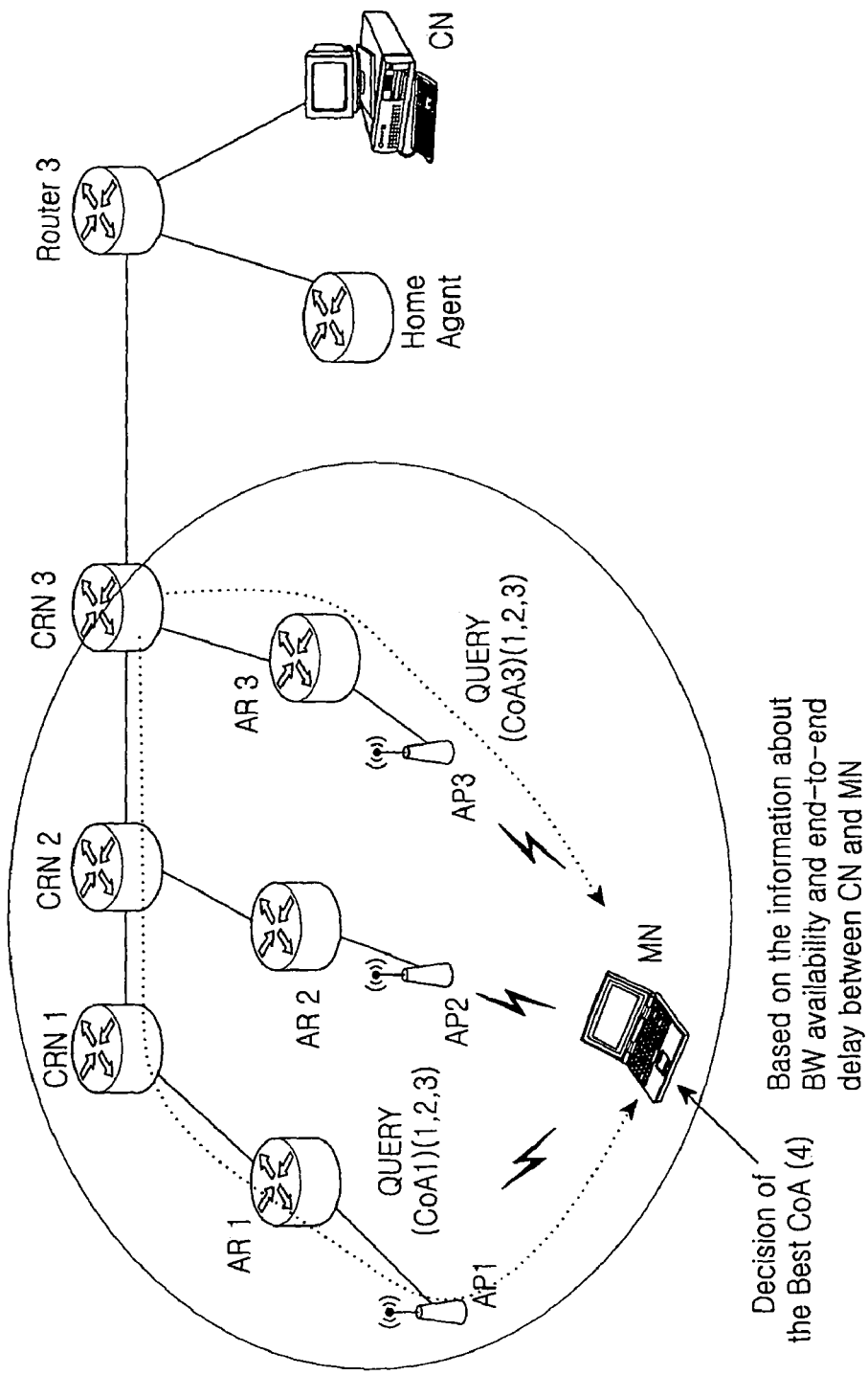
FIG. 18 illustrates an operation for establishing an additional path for load sharing according to an exemplary embodiment of the present invention.

FIG. 18 illustrates an operation for establishing an additional path for load sharing according to the second exemplary embodiment of the present invention. In the illustrated case of FIG. 18, resources have been reserved for the optimal path wherein CoA 2 and an additional path can be selected between the first path with CoA 1 and the third path with CoA 3.

Referring to FIG. 18, CRN 3 sends QUERY MESSAGEs to AR 1 and AR 3 in the two paths (candidates for the additional path) front including the optimal path. CRN 3 is a crossover router sharable by the optimal path and the candidates for the additional path. A first QUERY MESSAGE sent to AR 1 includes CoA 1 and a third QUERY MESSAGE sent to AR 3 includes CoA 3.

The first and third QUERY MESSAGEs are forwarded to the MN. Upon receipt of the QUERY MESSAGEs, the MN determines an additional path based on available resource information set in the QUERY MESSAGEs. Available resource information for a path indicates the minimum amount of bandwidths that ARs existing in the path can allocate. The MN selects a path that offers a maximum bandwidth or satisfies an MN-requested bandwidth as an additional path.

The MN may further consider the arrival order of the QUERY MESSAGEs in selecting the additional path. When a plurality of paths offers the same bandwidth or satisfies the requested bandwidth, the arrival order is considered.

Figure 19:
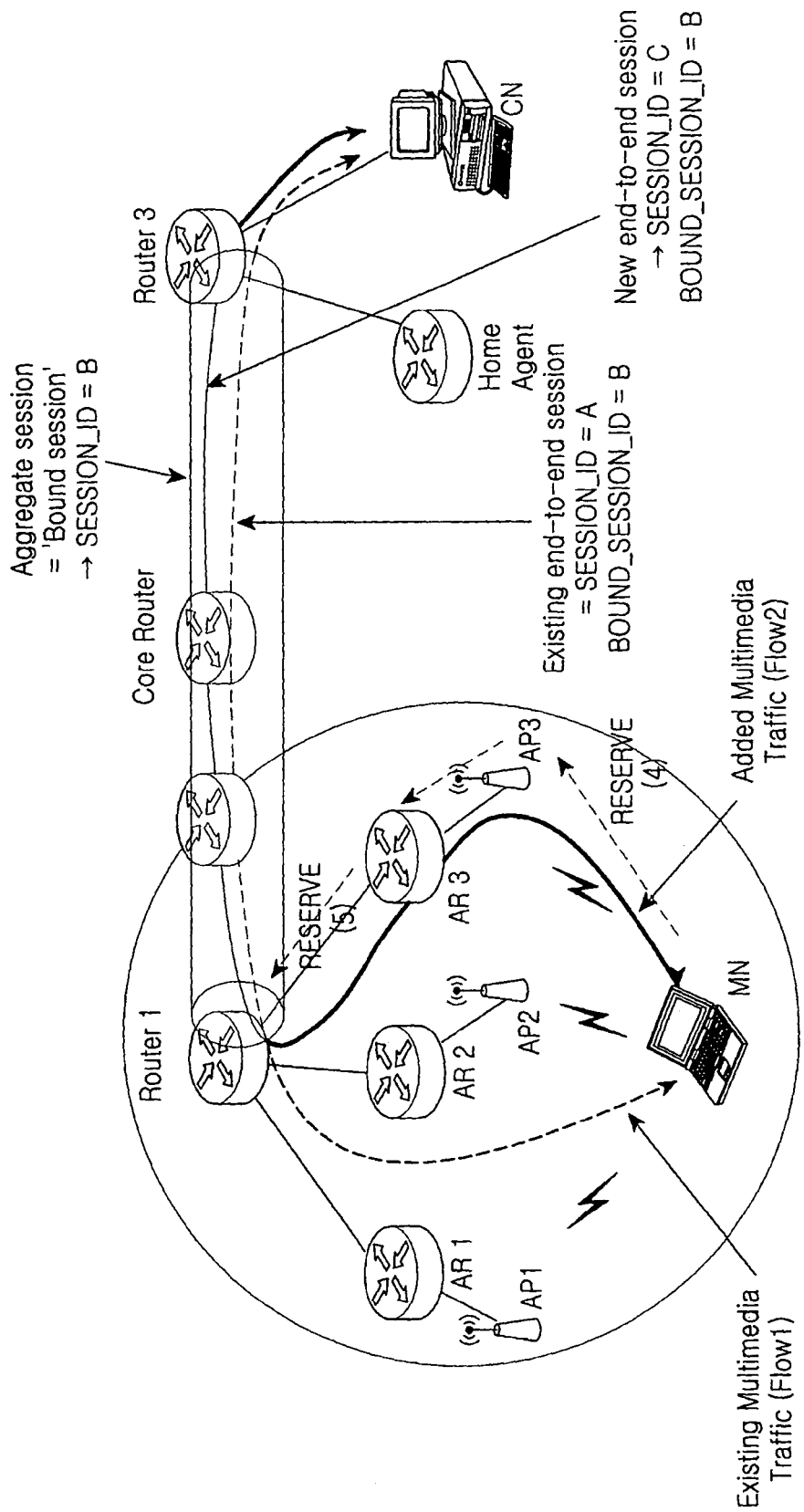
FIG. 19 illustrates an operation for establishing the additional path according to an exemplary embodiment of the present invention.

After the additional path is selected, it is established in a procedure illustrated in FIG. 19.

Referring to FIG. 19, the MN sends a RESERVE MESSAGE to AR 3 in the additional path. As with the additional path selection, CoA 3 can be used for the transmission of the RESERVE MESSAGE.

AR 3 reserves resources for the additional path and forwards the RESERVE MESSAGE to CRN 3. Thus, CRN 3 is aware that the path with CoA 3 is the additional path and reserves resources for the additional path.

In the mean time, CRN 3 sends a RESERVE MESSAGE to the CN. The resource reservation status between CRN 3 and the CN is updated according to the RESERVE MESSAGE. That is, a flow ID is updated using CoA 3. Also, resources are reserved for the path between CRN 3 and the CN according to the RESERVE MESSAGE.

If the resource reservation using the CoA of the added path has failed, resources are reserved using a CoA corresponding to the second-best path.

Figure 20:
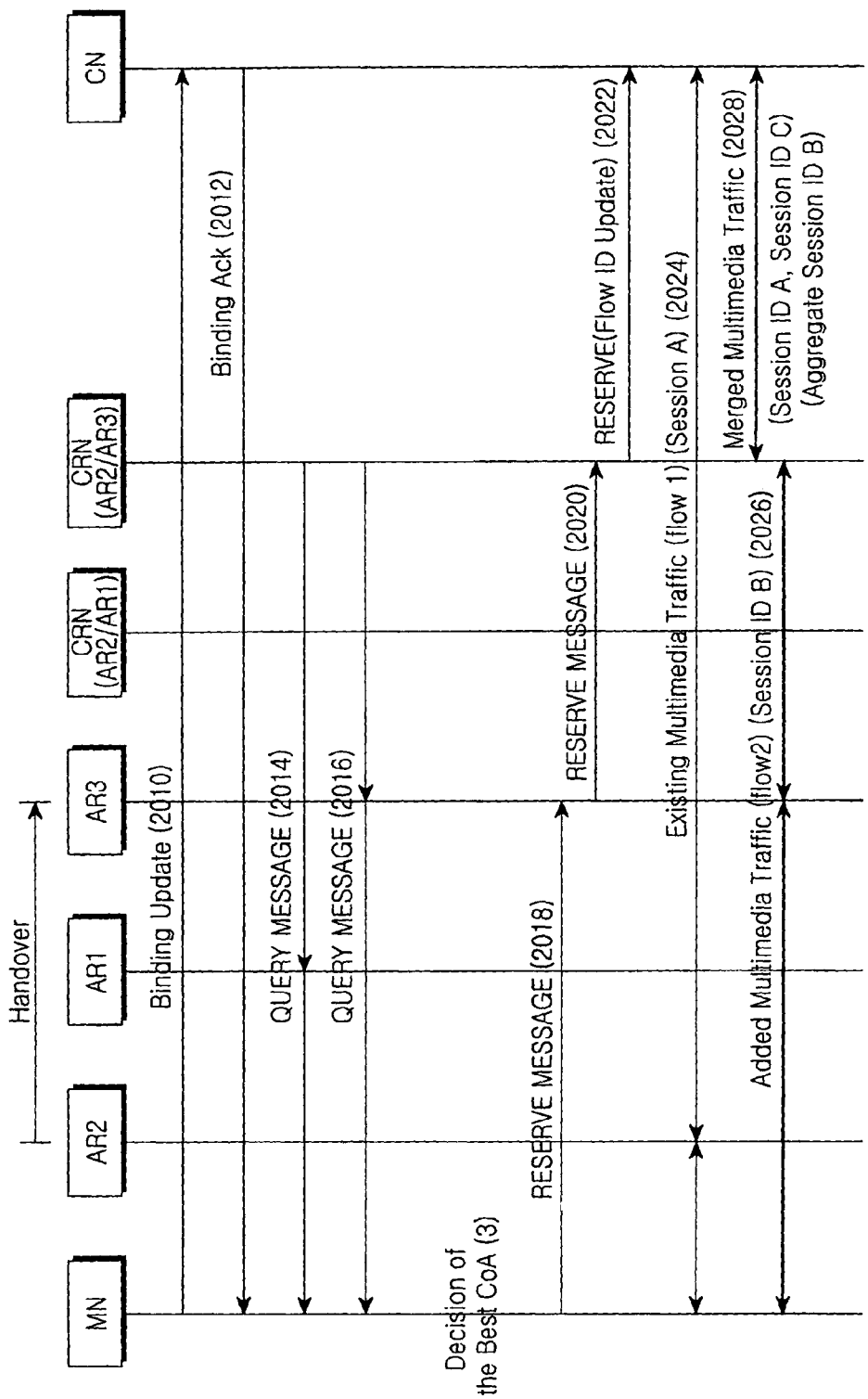
FIG. 20 is a diagram illustrating a signal flow for establishing the additional path in the mobile network under the multi-homed environment according to the second exemplary embodiment of the present invention.

FIG. 20 is a diagram illustrating a signal flow for establishing the additional path in the mobile network under the multi-homed environment according to the second exemplary embodiment of the present invention.

Referring to FIG. 20, the last process of the handover. Binding Update is performed in steps 2010 and 2012. To establish the additional path, CRN 3 sends the first QUERY MESSAGE with CoA 1 and the third QUERY MESSAGE with CoA 3 to AR 1 and AR 3, respectively. The first QUERY MESSAGE travels in the first path running to the MN through AR 1 in step 2014. During the propagation, the available resource information regarding the first path is written in the first QUERY MESSAGE. The available resource information is written by the router having minimum available resources among the routers existing in the first path.

Because the second path running from CRN 3 to the MN through AR 2 is in use as the optimal path, a QUERY MESSAGE is not sent in the second path.

The third QUERY MESSAGE travels in the third path running to the MN through AR 3 in step 2016. During the propagation, available resource information regarding the third path is written in the third QUERY MESSAGE. The available resource information is written by the router having the minimum available resources among the routers existing in the third path.

Upon receipt of the first and third QUERY MESSAGEs, the MN selects an additional path based on the available resource information of the first and third paths. Preferably, but not necessarily, CRN 3 selects a path that can offer a maximum bandwidth as the additional path. At the same time, CRN 3 may additionally consider the arrival order of the QUERY MESSAGEs in selecting the additional path.

Then the MN reserves resources for the additional path. For this purpose, the MN sends a RESERVE MESSAGE to the AR 3 existing in the additional path in step 2018. For the transmission of the RESERVE MESSAGE, CoA 3 is used, as with the additional path determination.

AR 3 reserves resources for the additional path. In step 2020, AR 3 forwards the RESERVE MESSAGE to CRN 3. Thus CRN 3 is aware that the path with CoA 3 has been selected as an additional path and reserves resources for the additional path.

In the mean time, CRN 3 updates the resource reservation status between CRN 3 and the CN in step 2022. That is, a flow ID is updated using the CoA. The flow ID identifies a data communication path composed of a sender address and a receiver address. Therefore, resources are reserved for the path between CRN 3 and the CN according to the RESERVE MESSAGE.

AR 2 determines a flow ID and a session ID for processing traffic in the already-established optimal path and provides the flow ID and the session ID to the MN and the CN in step 2022. In FIG. 20, the flow ID is flow 1 and the session ID is A for the optimal path.

AR 3 determines a flow ID and a session ID for processing traffic in the additional path and provides the flow ID and the session ID to the MN and CRN 3 in step 2026. In FIG. 11, the flow ID is flow 2 and the session ID is C for the additional path.

Meanwhile, CRN 3 sets a bound session ID to B for use between CRN 3 and the CN. Therefore, traffic is processed using the bound session ID, B between CRN 3 and the CN in step 2024.

As is apparent from the above description, the present invention provides a method for reserving resources in a mobile network under a multi-homed environment. Therefore, resources are efficiently utilized and a delay caused by resource reservation is reduced, thereby ensuring a uniform QoS. Further, a distributed resource reservation enables distributed processing of traffic and thus system load is shared.

The present invention can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, magnetic tapes, floppy disks, optical data storage devices; however computer readable media does not include carrier waves (such as data transmission through the Internet via wired or wireless transmission paths). The computer-readable recording medium can also be distributed over network-coupled computer systems so that the computer-readable code is stored and executed in a distributed fashion. Also, functional programs, codes, and code segments for accomplishing the present invention can be easily construed as within the scope of the invention by programmers skilled in the art to which the present invention pertains.

While certain exemplary embodiments of the invention have been shown and described herein with reference to certain preferred embodiments thereof, it will be understood by those skilled in the art that various changes in form and details may be made therein without departing from the spirit and scope of the present invention as defined by the appended claims and their equivalents.

What is claimed is:

1. A method for reserving resources for a Mobile Node (MN) having a plurality of wireless network interfaces in a mobile network under a multi-homed environment, comprising:
    transmitting query messages requesting a path be setup to a plurality of Access Routers (ARs) accessible through the plurality of wireless network interfaces by the MN;
    selecting an optimal path from among a plurality of paths running to a Correspondent Node (CN) via the ARs using path information set in the query messages propagated through the plurality of paths by a Crossover Router Node (CRN) shared by the plurality of paths;
    transmitting a resource reserve message through the selected optimal path by the CRN; and
    reserving resources according to the resource reserve message by routers existing in the optimal path.

2. The method of claim 1, further comprising updating a flow Identifier (ID) by transmitting a resource reserve message to the CN by the CRN when the optimal path is selected.

3. The method of claim 1, wherein routers existing in each of the paths write available bandwidth information in the query message propagated in each path.

4. The method of claim 3, wherein each of the routers existing in each path compares a bandwidth written in the query message propagated in each path with an available bandwidth that each router can allocate, and if the available bandwidth is less than the written bandwidth, each router updates the written bandwidth to the available bandwidth.

5. The method of claim 4, wherein the optimal path selection comprises selecting a query message with the largest bandwidth from among the query messages and determining a path in which the selected query message is propagated as the optimal path by the CRN.

6. The method of claim 5, wherein the optimal path selection further comprises considering the arrival order of the query messages, in addition to bandwidths written in the query messages, in selecting the optimal path.

7. The method of claim 4, wherein each router existing in each path drops the query message if the available bandwidth does not satisfy a bandwidth requested by the MN.

8. The method of claim 1, further comprising:
transmitting, if an additional path is required with the optimal path established, query messages in the other paths except for the optimal path by the MN;
selecting an additional path from among the other paths using path information set in the query messages by the CRN;
transmitting a resource reserve message through the selected additional path by the CRN; and
reserving resources according to the resource reserve message by routers existing in the additional path.

9. A method for reserving resources for a Mobile Node (MN) having a plurality of wireless network interfaces in a mobile network under a multi-homed environment, comprising:
transmitting query messages requesting a path be setup to a plurality of Access Routers (ARs) accessible through the plurality of wireless network interfaces by the MN;
selecting at least two paths from among a plurality of paths running to a Correspondent Node (CN) via the ARs using path information set in the query messages propagated through the plurality of paths by a Crossover Router Node (CRN) shared by the plurality of paths;
allocating a total allocation bandwidth separately to the at least two paths by the CRN;
transmitting a resource reserve message through the at least two paths by the CRN; and
reserving resources according to the resource reserve message by routers existing in the at least two paths.

10. The method of claim 9, further comprising updating a flow Identifier (ID) by transmitting a resource reserve message to the CN by the CRN when the at least two paths are selected.

11. The method of claim 9, wherein routers existing in each of the paths write available bandwidth information in the query message propagated in the each path.

12. The method of claim 11, wherein each of the routers existing in each path compares a bandwidth written in the query message propagated in each path with an available bandwidth that each router can allocate, and if the available bandwidth is less than the written bandwidth, each router updates the written bandwidth to the available bandwidth.

13. The method of claim 12, wherein the path selection comprises selecting at least two query messages with largest bandwidths from among the query messages and selecting the at least two paths in which the selected query messages are propagated by the CRN.

14. The method of claim 13, wherein the path selection further comprises considering the arrival order of the query messages in addition to bandwidths written in the query messages in selecting the at least two paths.

15. The method of claim 12, wherein each router existing in each path drops the query message if the available bandwidth does not satisfy a bandwidth requested by the MN.

16. A system for reserving resources for a Mobile Node (MN) having a plurality of wireless network interfaces in a mobile network under a multi-homed environment, the system comprising:
a transmitter node for transmitting query messages requesting a path be setup to a plurality of Access Routers (ARs) accessible through the plurality of wireless network interfaces by the MN;
a selector node for selecting an optimal path from among the plurality of paths running to a Correspondent Node (CN) via the ARs using path information set in the query messages propagated through the plurality of paths by a Crossover Router Node (CRN) shared by the plurality of paths;
a transmitter node for transmitting a resource reserve message through the selected optimal path by the CRN; and
a resource reserver node for reserving resources according to the resource reserve message by routers existing in the optimal path.

17. A system for reserving resources for a Mobile Node (MN) having a plurality of wireless network interfaces in a mobile network under a multi-homed environment, the system comprising:
a transmitter node for transmitting query messages requesting a path be setup to a plurality of Access Routers (ARs) accessible through the plurality of wireless network interfaces by the MN;
a selector node for selecting at least two paths from among a plurality of paths running to a Correspondent Node (CN) via the ARs using the path information set in the query messages propagated through the plurality of paths by a Crossover Router Node (CRN) shared by the plurality of paths;
a resource allocator node for allocating a total allocation bandwidth separately to the at least two paths by the CRN;
a transmitter node for transmitting a resource reserve message through the at least two paths by the CRN; and
a resource reserver node for reserving resources according to the resource reserve message by the routers existing in the at least two paths.

18. A non-transitory computer-readable recording medium storing a program for reserving resources for a Mobile Node (MN) having a plurality of wireless network interfaces in a mobile network under a multi-homed environment, comprising:
a first set of instructions for transmitting query messages requesting a path be setup to a plurality of Access Routers (ARs) accessible through the plurality of wireless network interfaces by the MN;
a second set of instructions for selecting an optimal path from among a plurality of paths running to a Correspondent Node (CN) via ARs using path information set in the query messages propagated through the plurality of paths by a Crossover Router Node (CRN) shared by the plurality of paths;
a third set of instructions for transmitting a resource reserve message through the selected optimal path by the CRN; and
a fourth set of instructions for reserving resources according to the resource reserve message by routers existing in the optimal path.

19. A non-transitory computer-readable recording medium storing a program for reserving resources for a Mobile Node (MN) having a plurality of wireless network interfaces in a mobile network under a multi-homed environment, comprising:

a first set of instructions for transmitting query messages requesting a path be setup to a plurality of Access Routers (ARs) accessible through the plurality of wireless network interfaces by the MN;

a second set of instructions for selecting at least two paths from among a plurality of paths running to a Correspondent Node (CN) via the ARs using path information set in the query messages propagated through the plurality of paths by a Crossover Router Node (CRN) shared by the plurality of paths;

a third set of instructions for allocating a total allocation bandwidth separately to the at least two paths by the CRN;

a fourth set of instructions for transmitting a resource reserve message through the at least two paths by the CRN; and a fifth set of instructions for reserving resources according to the resource reserve message by the routers existing in the at least two paths.

20. The method of claim 1, wherein the optimal path is selected according to at least one of an amount of bandwidth and a time delay of each of the plurality of paths.

21. The method of claim 1, wherein each of the query messages includes a Care-of-Address (CoA) to identify the path in which the corresponding query message propagates, a CRN Discovery flag indicating the number of the plurality of paths in which the query messages propagate, and an indication indicating how many CRNs in the corresponding path have receives the corresponding query message.

22. The System of claim 16, wherein each of the query messages includes a Care-of-Address (CoA) to identify the path in which the corresponding query message propagates, a CRN Discovery flag indicating the number of the plurality of paths in which the query messages propagate, and an indication indicating how many CRNs in the corresponding path have receives the corresponding query message.

* * * * *